United States Patent
Ohta

(10) Patent No.: US 9,759,801 B2
(45) Date of Patent: *Sep. 12, 2017

(54) METHOD OF AUTOMATICALLY TRACKING AND PHOTOGRAPHING CELESTIAL OBJECTS AND PHOTOGRAPHIC APPARATUS EMPLOYING THIS METHOD

(71) Applicant: RICOH IMAGING COMPANY, LTD., Tokyo (JP)

(72) Inventor: Makoto Ohta, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/747,297

(22) Filed: Jun. 23, 2015

(65) Prior Publication Data

US 2015/0285893 A1  Oct. 8, 2015

Related U.S. Application Data

(63) Continuation of application No. 13/117,517, filed on May 27, 2011, now Pat. No. 9,069,064.

(30) Foreign Application Priority Data

May 28, 2010 (JP) ................................ 2010-122909

(51) Int. Cl.
*G01S 3/786* (2006.01)
*H04N 5/225* (2006.01)

(52) U.S. Cl.
CPC ........... *G01S 3/7864* (2013.01); *H04N 5/225* (2013.01)

(58) Field of Classification Search
CPC ............................. G01S 3/7864; H04N 5/225
(Continued)

(56) References Cited

U.S. PATENT DOCUMENTS

| 4,688,092 A | * | 8/1987 | Kamel | ...................... G09B 9/52 33/320 |
| 6,516,252 B2 | * | 2/2003 | Suzuki | ...................... H01Q 3/08 342/357.31 |

(Continued)

FOREIGN PATENT DOCUMENTS

| JP | 05-19856 | 1/1993 |
| JP | 6-130446 | 5/1994 |

(Continued)

OTHER PUBLICATIONS

"JP06-130446 JPO Full Text and Abstract Translation". May 1994.*
(Continued)

*Primary Examiner* — Zhihan Zhou
(74) *Attorney, Agent, or Firm* — Greenblum & Bernstein, P.L.C.

(57) ABSTRACT

A celestial object is automatically tracked and photographed. Azimuth information of the celestial object is obtained relative to a photographic apparatus. First-tracking drive control data for performing a first-tracking photographing operation is calculated based on the azimuth information. The photographing operation is performed during a predetermined exposure time based on the first-tracking drive control data. After the photographing operation finishes, a first image taken in the photographing operation is obtained upon lapse of a predetermined time, and a second image corresponding to an ending of images taken by the photographing operation is obtained. An amount of deviation between a celestial object image in the first image and a corresponding celestial object image in the second image is calculated. A judgement is made as to whether a second-tracking photographing operation is to be performed based on a comparison between the deviation amount and a predetermined threshold.

22 Claims, 9 Drawing Sheets

(58) Field of Classification Search
USPC ............ 348/169, 143, 144, 147, 222.1, 345;
342/140; 382/103
See application file for complete search history.

(56) References Cited

U.S. PATENT DOCUMENTS

| | | | |
|---|---|---|---|
| 7,057,645 B1 | 6/2006 | Hara et al. | |
| 7,451,059 B2* | 11/2008 | Malchi ................... | G01C 3/06 340/945 |
| 2003/0202682 A1 | 10/2003 | Yanagisawa et al. | |
| 2006/0072213 A1 | 4/2006 | Shibayama et al. | |
| 2006/0158722 A1* | 7/2006 | Fujimoto ................. | G01S 5/16 359/399 |
| 2006/0284495 A1 | 12/2006 | Seo et al. | |
| 2007/0159390 A1* | 7/2007 | Kim ....................... | G09B 27/04 342/357.29 |
| 2009/0244720 A1 | 10/2009 | Yamaguchi | |
| 2010/0103251 A1* | 4/2010 | Numako ............... | G02B 27/646 348/61 |

FOREIGN PATENT DOCUMENTS

| | | |
|---|---|---|
| JP | 2000-224470 | 8/2000 |
| JP | 2000-330016 | 11/2000 |
| JP | 2003-259184 | 9/2003 |
| JP | 2004-201056 | 7/2004 |
| JP | 2005-331697 | 12/2005 |
| JP | 2006-093817 | 4/2006 |
| JP | 2006-106191 | 4/2006 |
| JP | 2006-279135 | 10/2006 |
| JP | 2006-287375 | 10/2006 |
| JP | 2006-337680 | 12/2006 |
| JP | 2007-025616 | 2/2007 |
| JP | 2007-089087 | 4/2007 |
| JP | 2008-017223 | 1/2008 |
| JP | 2008-289052 | 11/2008 |
| JP | 2009-58980 | 3/2009 |
| JP | 2009-175324 | 8/2009 |
| JP | 2009-244443 | 10/2009 |

OTHER PUBLICATIONS

"JP2006-287375 JPO Full Text and Abstract Translation". Oct. 2006.*
U.S. Pat. No. 8,717,441 which issued on May 6, 2014.
U.S. Pat. No. 8,447,071 which issued on May 21, 2013.
U.S. Appl. No. 13/170,612 to Koji Kato, filed Jun. 28, 2011.
International Search Report, dated Jun. 7, 2011 along with an English translation thereof.
International Search Report, dated Jul. 24, 2012 along with an English translation thereof.
Matsuzawa. JP06-130446 JPO Full Text and Abstract Translation. May 1994.
Hiroya. JP2006-287375 JPO Full Text and Abstract Translation. Oct. 2006.
Office Action issued in JAPAN Counterpart Patent Appl. No. 2015-102344, dated Jun. 28, 2016, along with an English translation thereof.

* cited by examiner

METHOD OF AUTOMATICALLY TRACKING AND PHOTOGRAPHING CELESTIAL OBJECTS AND PHOTOGRAPHIC APPARATUS EMPLOYING THIS METHOD

CROSS-REFERENCE RELATED APPLICATIONS

The present application is a continuation of pending U.S. application Ser. No. 13/117,517 filed May 27, 2011, the disclosure of which is incorporated by reference herein in its entirety.

BACKGROUND OF THE INVENTION

1. Field of the Invention

The present invention relates to a method of automatically tracking and photographing celestial objects which enables the capture of a freeze-frame picture of a celestial object(s) in long exposure astrophotography, and further relates to a photographic apparatus employing this method.

2. Description of the Related Art

If long exposure astrophotography is carried out with a fixed camera (photographic apparatus), added light of stars during a long exposure form straight or curved light trails in the captured image, since celestial objects move relative to the camera due to the earth's rotation (diurnal motion). To carry out a long exposure in order to photograph a celestial object so that the celestial object appears to be still (stationary) relative to a photosensitive film or an image sensor (image pickup device), an equatorial equipped with an auto tracking system is generally used.

In recent years, a method of obtaining a still image of celestial objects such as planets and stars in long exposure astrophotography has been proposed in which a celestial object(s) is photographed a plurality of times with a fixed digital camera without using an equatorial, and thereafter, the images thus obtained at the plurality of times are added while correcting the positions of the celestial object(s) using data on the obtained images (see Japanese Unexamined Patent Publications Nos. 2006-279135 and 2003-259184).

However, an equatorial equipped with an auto tracking system is generally expensive, heavy and difficult to handle. The type of digital camera (disclosed in Japanese Unexamined Patent Publications Nos. 2006-279135 and 2003-259184) which synthesizes a plurality of images has inferior image registration accuracy and is slow in image processing speed, and therefore, it is practically impossible to synthesize a plurality of astronomical images using only such a type of digital camera while performing tracking astrophotography.

SUMMARY OF THE INVENTION

The present invention provides a method of automatically tracking and photographing celestial objects which enables the capture of a still image of a celestial object(s) such as a star or a planet in a state where each celestial object appears stationary with respect to a fixed point on the rotating Earth in long exposure astrophotography without using an equatorial with a camera (photographic apparatus) directed toward an arbitrarily-selected celestial object and fixed with respect to the ground (earth). The present invention also provides a photographic apparatus that employs this method of automatically tracking and photographing celestial objects.

According to an aspect of the present invention, a method of automatically tracking and photographing a celestial object, is provided, which moves relative to a photographic apparatus due to diurnal motion so that an image of the celestial object that is formed on an imaging surface of an image sensor via a photographing optical system of the photographic apparatus becomes stationary relative to a predetermined imaging area of the image sensor during a celestial-object auto-tracking photographing operation, the method including inputting photographing azimuth angle information and photographing elevation angle information of the photographic apparatus which is directed toward the celestial object; calculating preliminary-tracking drive control data for use in performing a preliminary tracking operation based on the photographing azimuth angle information and the photographing elevation angle information; obtaining a first preliminary image and a second preliminary image which respectively correspond to a commencement point and a termination point of the preliminary tracking operation; calculating an amount of deviation between a celestial object image in the first preliminary image and a corresponding celestial object image in the second preliminary image; calculating, from the amount of deviation, actual-tracking drive control data for use in performing an actual tracking operation with the deviation amount cancelled; and performing the celestial-object auto-tracking photographing operation based on the actual-tracking drive control data.

It is desirable for the performing of the celestial-object auto-tracking photographing operation to include performing an exposure operation while moving at least one of the predetermined imaging area of the image sensor and the image of the celestial object that is formed on the imaging surface of the image sensor.

It is desirable for the performing of the celestial-object auto-tracking photographing operation to include correcting at least one of the photographing azimuth angle information and the photographing elevation angle information with the deviation amount, and calculating actual-tracking drive control data for use in moving at least one of the predetermined imaging area of the image sensor and the image of the celestial object that is formed on the imaging surface of the image sensor based on corrected the at least one of the photographing azimuth angle information and the photographing elevation angle information.

It is desirable for the performing of the celestial-object auto-tracking photographing operation to include correcting the preliminary-tracking drive control data with the deviation amount to calculate actual-tracking drive control data for use in moving at least one of the predetermined imaging area of the image sensor and the image of the celestial object that is formed on the imaging surface of the image sensor.

It is desirable for the performing of the celestial-object auto-tracking photographing operation to includes determining whether or not the deviation amount exceeds a predetermined threshold value; recalculating the actual-tracking drive control data for use in performing the actual tracking operation with the deviation amount cancelled in the case where the deviation amount is determined as exceeding the predetermined threshold value; and substituting the preliminary-tracking drive control data for the actual-tracking drive control data already calculated in the case where the deviation amount is determined as one of equal to and less than the predetermined threshold value.

It is desirable for the actual-tracking drive control data to be for moving the image sensor in directions orthogonal to an optical axis of the photographing optical system and rotating the image sensor about an axis parallel to the optical axis while performing an exposure operation.

It is desirable for the predetermined imaging area of the image sensor to be a trimmed imaging area which is formed by partly trimming an entire imaging area of the image sensor electronically, and for the actual-tracking drive control data to be for moving the trimmed imaging area in directions orthogonal to an optical axis of the photographing optical system and rotating the trimmed imaging area about an axis parallel to the optical axis while performing an exposure operation.

It is desirable for the calculating of the deviation amount to include converting a position of the celestial object image in the first preliminary image to first X-Y coordinates in an X-Y coordinate system and a position of the corresponding celestial object image in the second preliminary image to second X-Y coordinates in the X-Y coordinate system, and calculating the deviation amount from a difference between the first X-Y coordinates and the second X-Y coordinates.

It is desirable for the following conditions (V) and (VI) to be satisfied:

$$\Delta X = Xd - Xd \cos \theta + Yd \sin \theta \quad \text{(V)}$$

$$\Delta Y = Yd - Xd \sin \theta - Yd \cos \theta \quad \text{(VI)}$$

wherein $\Delta X$ designates the amount of deviation between an X-coordinate position of the celestial object image in the first preliminary image and an X-coordinate position of the corresponding celestial object image in the second preliminary image; $\Delta Y$ designates the amount of deviation between a Y-coordinate position of the celestial object image in the first preliminary image and a Y-coordinate position of the corresponding celestial object image in the second preliminary image; Xd designates an amount of deviation of an X-coordinate position of the center point of the image that is actually captured by the photographic apparatus with respect to the position of the center point of the image that is calculated based on the input photographing azimuth angle information and the input photographing elevation angle information of the photographic apparatus; Yd designates an amount of deviation of a Y-coordinate position of the center point of the image that is actually captured by the photographic apparatus with respect to the position of the center point of the image that is calculated based on the input photographing azimuth angle information and the input photographing elevation angle information of the photographic apparatus; and $\theta$ designates a rotational angle of the celestial object image in each of the first preliminary image and the second preliminary image with a center of the imaging surface defined as a rotational center.

It is desirable for the method to include inputting focal length information of the photographing optical system, and calculating a first amount of deviation between the photographing azimuth angle information and the theoretically-correct photographing azimuth angle information and a second amount of deviation between the photographing elevation angle information and the theoretically-correct photographing elevation angle information using the focal length information, the deviation amount Xd and the deviation amount Yd from the following equations:

$$\Delta h = \arctan(Yd/f)$$

$$\Delta A = \arccos((\cos(\arctan(Xd/f)) - \cos^2(hs + \arctan(Yd/f)/2))/\cos^2(hs + \arctan(Yd/f)/2))$$

wherein f designates the focal length information of the photographing optical system, hs designates the photographing elevation angle information, $\Delta h$ designates the first deviation amount, and $\Delta A$ designates the second deviation amount.

In an embodiment, a photographic apparatus is provided, which automatically tracks and photographs a celestial object which moves relative to the photographic apparatus due to diurnal motion so that an image of the celestial object that is formed on an imaging surface of an image sensor via a photographing optical system of the photographic apparatus becomes stationary relative to a predetermined imaging area of the image sensor during a celestial-object auto-tracking photographing operation, the camera including an inputter which inputs photographing azimuth angle information and photographing elevation angle information of the photographic apparatus directed toward the celestial object; an image sensor which obtains a first preliminary image and a second preliminary image which respectively correspond to a commencement point and a termination point of the preliminary tracking operation; and a controller. The controller calculates preliminary-tracking drive control data for use in performing a preliminary tracking operation based on the photographing azimuth angle information and the photographing elevation angle information. The controller calculates an amount of deviation between a celestial object image in the first preliminary image and a corresponding celestial object image in the second preliminary image. The controller calculates, from the amount of deviation, actual-tracking drive control data for use in performing an actual tracking operation with the deviation amount cancelled. The controller performs the celestial-object auto-tracking photographing operation based on the actual-tracking drive control data.

According to the method of automatically tracking and photographing celestial objects, and a photographic apparatus that employs this method, according to the present invention, since this method includes: calculating the preliminary-tracking drive control data, which is for use in performing a preliminary tracking operation, based on the photographing azimuth angle information and the photographing elevation angle information; obtaining the first preliminary image and the second preliminary image, which respectively correspond to the commencement point and the termination point of the preliminary tracking operation; calculating the amount of deviation between the celestial object image in the first preliminary image and the corresponding celestial object image in the second preliminary image; calculating, from the amount of deviation, the actual-tracking drive control data, which is for use in performing an actual tracking operation, with the deviation amount cancelled; and performing the celestial-object auto-tracking photographing operation based on the actual-tracking drive control data, the celestial-object auto-tracking photographing operation with high precision can be achieved by the calculation of the actual-tracking drive control data even if the input photographing azimuth angle and the input photographing elevation angle are low in accuracy, which makes it possible to capture a still image of a celestial object(s) in a state where each celestial object appears stationary even in long exposure astrophotography.

The present disclosure relates to subject matter contained in Japanese Patent Application No. 2010-122909 (filed on May 28, 2010) which is expressly incorporated herein by reference in its entirety.

BRIEF DESCRIPTION OF THE DRAWINGS

The present invention will be described below in detail with reference to the accompanying drawings in which:

FIGS. 7A and 7B are explanatory diagrams for illustrating a technique of determining actual-tracking drive control data (dA/dt, dh/dt, dθ/dt) using declination δ, hour angle H, photographing azimuth angle As and photographing elevation angle hs with respect to a celestial object and focal length f during the celestial-object auto-tracking photographing operation according to the present invention, wherein FIG. 7A is a diagraph illustrating an equatorial coordinate system and FIG. 7B is a diagraph illustrating a spherical triangle of the celestial hemisphere shown in FIG. 7A;

DESCRIPTION OF THE PREFERRED EMBODIMENT

Figure 1:
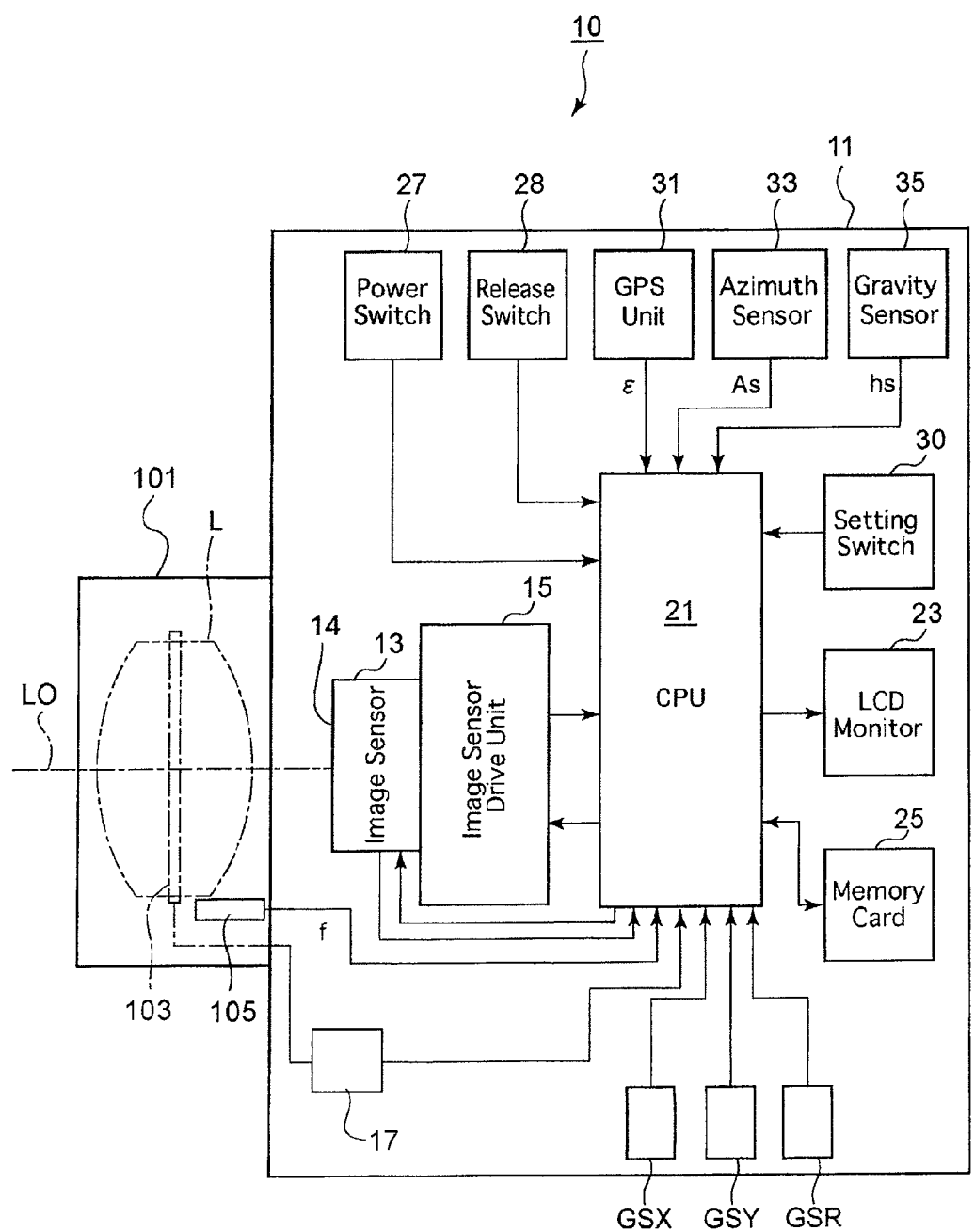
FIG. 1 is a block diagram illustrating main components of an embodiment of a digital camera which is capable of automatically tracking and photographing celestial objects according to the present invention.

An embodiment of a method of automatically tracking and photographing celestial objects according to the present invention and an embodiment of a digital camera 10 employing this method will be discussed hereinafter. As shown in FIG. 1, the present embodiment of the digital camera (photographic apparatus) 10 is provided with a camera body 11 and a photographing lens 101 (that contains a photographing optical system L). The digital camera 10 is provided, in the camera body 11 behind the photographing optical system L, with an image sensor 13 serving as an image pickup device. An optical axis Z of the photographing optical system L is orthogonal to an imaging surface (photosensitive surface/imaging plane) 14 of the image sensor 13. The image sensor 13 is mounted onto an image sensor drive unit (image sensor mover/anti-shake unit) 15. The image sensor drive unit 15 is provided with a fixed stage, a movable stage which is movable relative to the fixed stage, and an electromagnetic circuit for moving the movable stage relative to the fixed stage. The image sensor 13 is held by the movable stage. The image sensor 13 (the movable stage) is controlled and driven to linearly move in desired directions orthogonal to the optical axis Z at a desired moving speed and to rotate about an axis parallel to the optical axis Z (instantaneous center at some point in a plane orthogonal to the optical axis Z) at a desired rotational speed. This type of image sensor drive unit 15 is known in the art as an anti-shake unit of an image shake corrector (shake reduction system) incorporated in a camera disclosed in, e.g., Japanese Unexamined Patent Publication No. 2007-25616.

The photographing lens 101 is provided with a diaphragm (adjustable diaphragm) 103 in the photographing optical system L. The f-number (degree of opening/closing the diaphragm 103) is controlled by a diaphragm drive control mechanism 17 provided in the camera body 11. The photographing lens 101 of the digital camera 10 is provided with a focal length detector (focal length inputter) 105 for detecting the focal length f of the photographing optical system L.

The digital camera 10 is provided with a CPU 21 which controls the overall operation of the digital camera 10. The CPU (controller/calculator) 21 drives the image sensor 20 and controls the operation thereof, and performs a signal processing operation on an image signal of a captured object image to display this image on an LCD monitor 23, and writes image data of this image into a removable memory card 25. To detect vibrations applied to the digital camera 10 when the image sensor drive unit 15 is used as an anti-shake unit, the CPU 21 inputs signals sensed by an X-direction gyro sensor GSX, a Y-direction gyro sensor GSY and a rotational-direction gyro sensor GSR.

The camera body 11 is provided with various switches such as a power switch 27, a release switch 28 and a setting switch 30. The CPU 21 performs controls according to the ON/OFF states of these switches 27, 28 and 30. For instance, the CPU 21 turns ON/OFF the power supply from a battery (not shown) upon receipt of an operation signal from the power switch 27, and performs a focusing process, a photometering process and an image capturing process (astronomical-image capturing process) upon receipt of an operation signal from the release switch 28. The setting switch 30 is for selectively setting various photography modes (exposure modes) such as a celestial-object auto tracking photography mode and a normal photography mode.

The digital camera 10 is provided in the camera body 11 with a GPS unit 31 serving as a latitude information inputter, an azimuth angle sensor 33 serving as an azimuth information inputter, and a gravity sensor 35 serving as a photographing elevation angle information inputter. Latitude information $\epsilon$, azimuth information and (photo date information) date/time information (Greenwich Mean Time information) are input to the CPU 21 from the GPS unit 31, and photographing azimuth angle information As and photographing elevation angle information hs are input to the CPU 21 from an azimuth angle sensor 33 and a gravity sensor 35, respectively. The CPU 21 drives the image sensor drive unit 15 and controls operation thereof based on the latitude information $\epsilon$, which is input from the GPS unit 31, the photographing azimuth angle information As and the photographing elevation angle information hs, which are respectively input from the azimuth angle sensor 33 and the gravity sensor 35, and focal length information f input from the focal length detector 105. A reference position of the camera body 11 (specifically the image sensor 13 thereof) is, e.g., a position (posture) in which the long-side direction of the image sensor 13 is coincident with the horizontal direction (X-direction), and this reference position is defined by an X-Y coordinate system the X-axis (X-direction) and Y-axis (Y-direction) of which correspond to the long-side direction and the short-side direction of the rectangular image sensor 13, respectively.

Each of the above described GPS unit 31, azimuth angle sensor 33 and gravity sensor 35 can be not only a built-in type that is incorporated into the camera body 11 but an external type that is attached to the camera body. Specifically, it is possible to install such external devices to an accessory shoe or a bracket attached to the base plate of the camera body 11, and output signals from the external devices can be input to the CPU 21 via electrical contacts on the accessory shoe or a connector such as a USB connector (socket/plug). Date/time information that is input to the CPU 21 can be obtained from a built-in clock, and latitude information ϵ can be manually input to the CPU 21 by the user via the setting switch 30.

To photograph a still image of a celestial object(s) that moves relative to the digital camera 10 due to diurnal motion, the digital camera 10 performs an auto-tracking photographing operation while moving at least one of a predetermined imaging area of the image sensor 13 (the imaging surface 14) and an image of the celestial object that is formed on the imaging surface 14 of the image sensor 13 relative to the digital camera 10 so that the image of the celestial object, which is formed on the imaging surface 14 via the photographing optical system L of the digital camera 10, becomes stationary relative to the predetermined imaging area of the image sensor during the auto-tracking photographing operation. Operations of the digital camera 10 will be discussed in further detail hereinafter.

With the digital camera 10 directed toward an arbitrarily-selected celestial object, the azimuth angle sensor 33 actually measures (detects) the photographing azimuth angle As of the digital camera 10 and the gravity sensor 35 actually measures (detects) the photographing elevation angle hs. The azimuth angle sensor 33 and the gravity sensor 35 input the actually measured photographing azimuth angle As and photographing elevation angle hs to the CPU 21.

Based on the photographing azimuth angle As and the photographing elevation angle hs that are input from the azimuth angle sensor 33 and the gravity sensor 35, respectively, the CPU 21 calculates preliminary-tracking drive control data (dAs/dt, dhs/dt, dθ/dt) for use in performing a preliminary tracking operation. Based on this preliminary-tracking drive control data (dAs/dt, dhs/dt, dθ/dt), the CPU 21 performs an exposure operation while performing the aforementioned preliminary tracking operation (in which the CPU 21 linearly moves the image sensor 13 and rotates the image sensor 13 about an axis parallel to the optical axis LO) to obtain a first preliminary image and a second preliminary image which correspond to the commencement point and the termination point of the preliminary tracking operation, respectively.

It is possible to obtain the first preliminary image and the second preliminary image by making an exposure with a short exposure time at each of the commencement point and the termination point of the preliminary tracking operation, or by making an exposure with a long exposure time during the preliminary tracking operation and extracting a photographic image at each of the commencement point and the termination point (i.e., both ends) of the preliminary tracking operation.

The CPU 21 calculates the amount of deviation (ΔX) and the amount of deviation (ΔY) of the image of a celestial object in the obtained first preliminary image from the image of the corresponding celestial object in the obtained second preliminary image in the horizontal direction (X-direction) and the vertical direction (Y-direction), respectively, and calculates actual-tracking drive control data (dA/dt, dh/dt, dθ/dt) for use in performing an actual tracking operation with the deviation amounts (ΔX, ΔY) canceled. Two methods (first and second methods) of calculating the actual-tracking drive control data (dA/dt, dh/dt, dθ/dt) which will be discussed hereinafter are available.

According to the first method, from the calculated deviation amounts (ΔX, ΔY), the photographing azimuth angle information As that is input from the azimuth angle sensor 33 and the photographing elevation angle information hs that is input from the gravity sensor 35 are corrected by an error (deviation amount) ΔA in the photographing azimuth angle As and an error (deviation amount) Δh in the photographing elevation angle information hs to obtain a theoretically-correct photographing azimuth angle information A (i.e., As+ΔA) and a theoretically-correct photographing elevation angle information h (i.e., hs+Δh), respectively. Thereafter, based on the theoretically-correct photographing azimuth angle information A and the theoretically-correct photographing elevation angle information h, the CPU 21 calculates the actual-tracking drive control data (dA/dt, dh/dt, dθ/dt). If one of the azimuth angle sensor 33 and the gravity sensor 35 is a high-precision sensor (if one of the photographing azimuth angle information As and the photographing elevation angle information hs is close to the theoretically-correct photographing azimuth angle information A or the theoretically-correct photographing elevation angle information h), it is possible to only correct the error caused by the other.

According to the second method, from the calculated deviation amounts (ΔX, ΔY), the preliminary-tracking drive control data (dAs/dt, dhs/dt, dθ/dt) is directly corrected to calculate the actual-tracking drive control data (dA/dt, dh/dt, dθ/dt).

If the photographing azimuth angle As and the photographing elevation angle hs that are respectively input from the azimuth angle sensor 33 and the gravity sensor 35 are accurate (high in accuracy), there is no need to calculate the actual-tracking drive control data (dA/dt, dh/dt, dθ/dt); namely, a high-precision celestial-object auto-tracking photographing operation can be performed using the preliminary-tracking drive control data (dAs/dt, dhs/dt, dθ/dt).

Accordingly, it is desirable for the CPU 21 to determine whether or not at least one of the calculated deviation amount ΔX and the calculated deviation amount ΔY exceeds a corresponding predetermined threshold value, and to recalculate the preliminary-tracking drive control data (dAs/dt, dhs/dt, dθ/dt) if either the calculated deviation amount ΔX and the calculated deviation amount ΔY exceeds the corresponding threshold value, or to substitute the preliminary-tracking drive control data (dAs/dt, dhs/dt, dθ/dt) for the actual-tracking drive control data (dA/dt, dh/dt, dθ/dt) if neither of the calculated deviation amount ΔX and the calculated deviation amount ΔY exceeds the corresponding threshold value. According to this control, the burden on the CPU 21 can be reduced by omitting redundant computations.

Accordingly, the CPU 21 performs the celestial-object auto-tracking photographing operation (actual photographing operation) while performing the actual tracking operation (in which the CPU 21 linearly moves the image sensor 13 and rotates the image sensor 13 about an axis parallel to the optical axis LO) based on the calculated actual-tracking drive control data (dA/dt, dh/dt, dθ/dt).

A principle which enables the celestial-object auto tracking photographing operation to be performed by linear movement (linear shift) of the imaging surface (imaging area) 14 in directions orthogonal to the optical axis LO and rotational movement of the imaging surface (imaging area) 14 about an axis parallel to the optical axis LO will be hereinafter discussed with reference to FIGS. 3 through 5. In the following descriptions, a direction orthogonal to the optical axis LO and parallel to the long-side direction of the rectangular imaging surface 14 of the image sensor 13 in its initial position is defined as X-direction (direction parallel to the X-axis), a direction orthogonal to the optical axis LO and parallel to the short-side direction of the rectangular imaging surface 14 of the image sensor 13 in its initial position is defined as Y-direction (direction parallel to the Y-axis), and a direction parallel to the optical axis LO is defined as Z-direction (direction parallel to a Z-axis orthogonal to both the X-axis and the Y-axis). In addition, an orthogonal coordinate system in a plane orthogonal to the optical axis LO is defined as the aforementioned X-Y coordinate system. The image sensor drive unit 15 is provided with image sensor (13) mechanical movement limits Lx, Ly in the X-direction and the Y-direction from the initial position thereof, and is provided with an image sensor (13) mechanical rotation limit Lθ about the Z-axis that extends in the optical axis LO direction (Z-direction).

Figure 3:
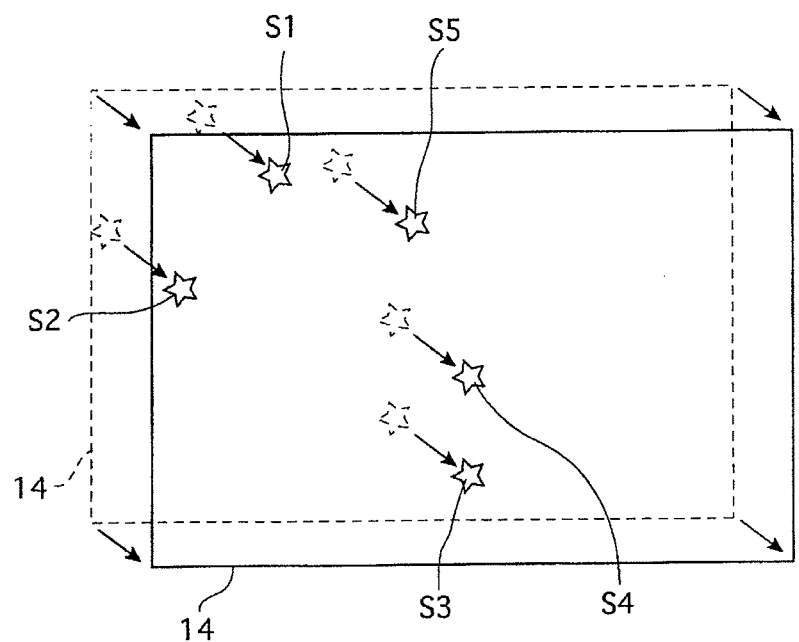
FIG. 3 is a diagram showing an image photographed in the celestial-object auto tracking photography mode when it is assumed that each celestial object image merely shifts from one point to another.
Figure 3:
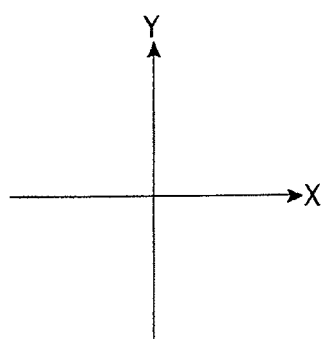

FIG. 3 shows a state where it is assumed that the image sensor 13 is driven only to shift in the X-direction and the Y-direction (i.e. not to rotate about an axis parallel to the optical axis LO) by control of the CPU 21. In the linear shift control in the X and Y directions, in which no rotation movement control is performed, celestial object images S1, S2, S3, S4 and S5 formed on the imaging surface 14 integrally move in the X and Y directions without changing the relative position therebetween. Accordingly, if the image sensor 13 is driven to shift by an amount in the X and Y directions which corresponds to the shift amount of the celestial object images S1, S2, S3, S4 and S5 in the X and Y directions, a high-precision celestial-object auto-tracking photographing operation can be, in theory, performed. Namely, even if a calculated (arithmetic) image center point which is determined by calculation from the photographing azimuth angle information As and the photographing elevation angle information hs, which are respectively input from the azimuth angle sensor 33 and the gravity sensor 35, deviates from the actual photograph direction of the digital camera 10, the shift control in the X and Y directions is not adversely effected. Accordingly, the deviation between the calculated image center point and the actual photograph direction of the digital camera 10 only influences the rotation control of the image sensor 13.

Figure 4:
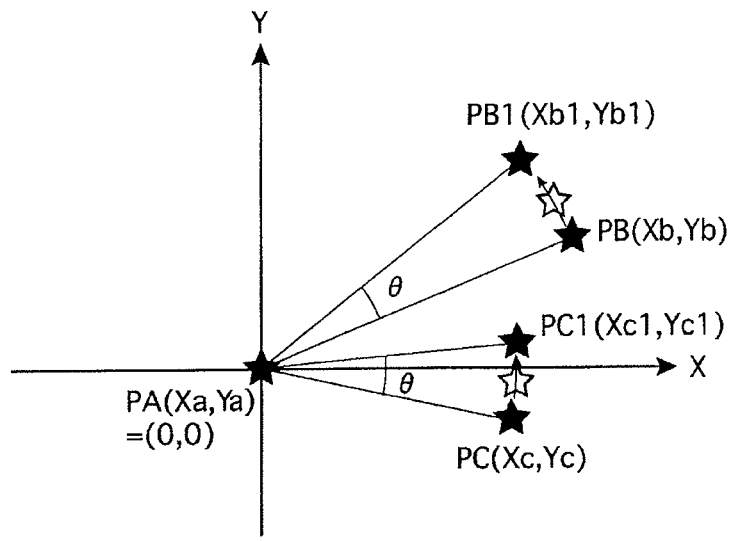
FIG. 4 is an explanatory diagram which illustrates a state where celestial object images PB and PC have rotated about a celestial object image PA.
Figure 5:
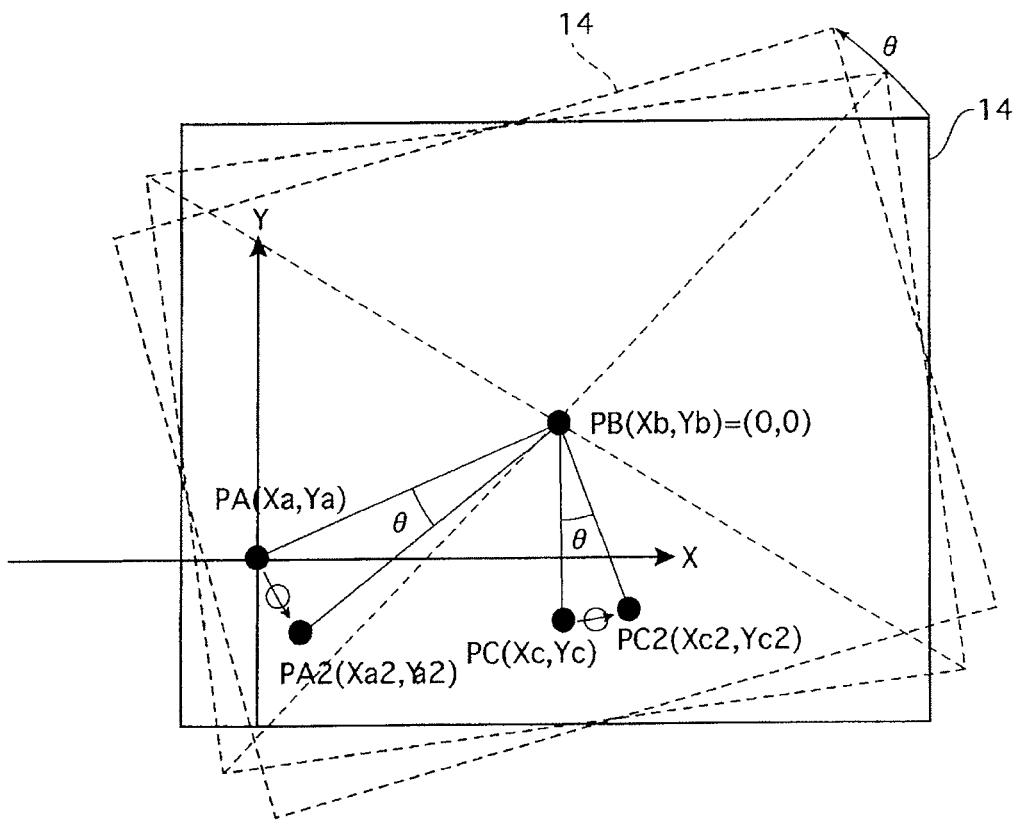
FIG. 5 is an explanatory diagram which illustrates a state where the celestial object images PA and PC have rotated about the celestial object image PB.

However, celestial object images PA, PB and PC formed on the imaging surface 14 integrally rotate about the center (image center) of the imaging surface 14 as shown in FIGS. 4 and 5 if it is assumed that the center of the imaging surface 14, which captures the celestial object images PA, PB and PC, corresponds to the aforementioned calculated image center point.

In FIG. 4, if the celestial object image PA is deemed to be positioned at the calculated image center point, each of the celestial object images PB and PC has rotated about the celestial object image PA in the counterclockwise direction with respect to FIG. 4 by an angle of rotation θ. In this case, the calculated image center point, where the celestial objet image PA is positioned, is defined as an origin point of the X-Y coordinate system. If the point PB (Xb, Yb) is rotated about the origin point (celestial image) PA by the angle of rotation θ and if the point PB after it has rotated about the origin point PA the angle of rotation θ is defined as a point PB1 (Xb1, Yb1), the coordinates of the point PB1 can be expressed by the following equation (I):

$$PB1(Xb1, Yb1) = (Xb \cos\theta - Yb \cos\theta, Xb \sin\theta + Yb \cos\theta) \quad (I)$$

In FIG. 5, each of the celestial object images PA and PC has rotated about the celestial object image PB in the counterclockwise direction with respect to FIG. 5 by the angle of rotation θ since the celestial object image PB is positioned at the calculated image center position. Since the point PA has rotated about the point PB (Xb, Yb) by the angle of rotation θ to move to a point PA2 (Xa2, Ya2), the coordinates of the point PA2 (Xa2, Ya2) can be expressed by the following equation (II):

$$PA2(Xa2, Ya2)(Xb - Xb \cos\theta + Yb \sin\theta, Yb - Xb \sin\theta - Yb \cos\theta) \quad (II)$$

Accordingly, the amount of movement of the point PA from the initial position thereof shown in FIG. 5 with a rotational center of the imaging surface 14 defined as the point PB and the amount of movement of the point PB from the initial position shown in FIG. 4 with a rotational center of the imaging surface 14 defined as the point PA can be expressed by the following equations (III) and (IV), respectively:

$$\text{Movement amount of point } PA = (Xa2 - Xa, Ya2 - Ya) \quad (III)$$
$$= \begin{pmatrix} Xb - Xb\cos\theta + Yb\sin\theta, \\ Yb - Xb\sin\theta - Yb\cos\theta \end{pmatrix}$$

$$\text{Movement amount of point } PB = (Xb - Xb1, Yb - Yb1) \quad (IV)$$
$$= \begin{pmatrix} Xb - Xb\cos\theta + Yb\sin\theta, \\ Yb - Xb\sin\theta - Yb\cos\theta \end{pmatrix}$$

Figure 6:
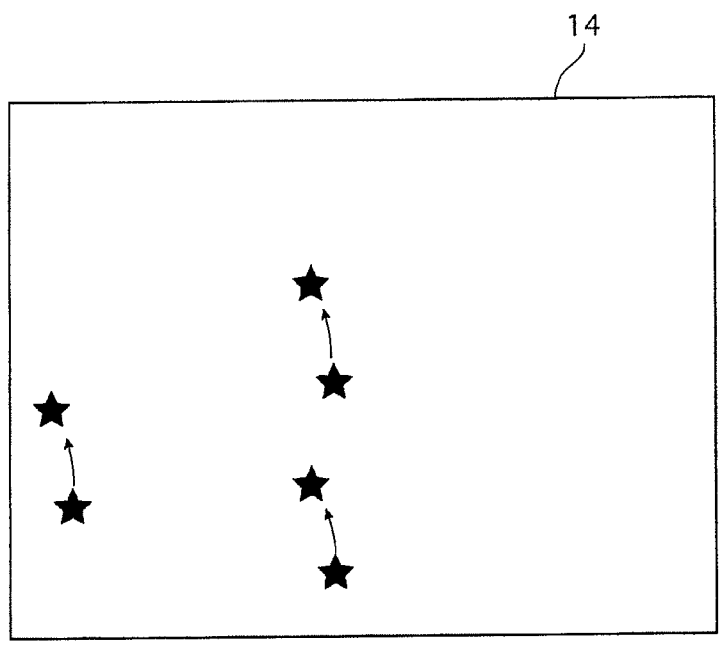
FIG. 6 is an explanatory diagram which illustrates movements of celestial object images on an imaging surface (picture plane)

It can be understood from these equations that the amount of movement of the point PA from the initial position thereof and the amount of movement of the point PB from the initial position thereof are mutually identical. Likewise, the amount of movement of the point PC from the initial position is identical to that of the point PB in FIG. 4 and the amount of movement of the point PC from the initial position is identical to that of the point PA in FIG. 5. According to the above, when a celestial object image rotates by the rotational angle θ in the imaging surface 14, all points in the imaging surface 14 integrally move in a linear manner as shown in FIG. 6 if the image sensor 13 (the imaging surface 14) is rotated by the same rotational angle. Additionally, if the image sensor 13 (the imaging surface 14) is driven to move in the X and Y directions by an amount of movement corresponding to the linear movement amount, a high-precision celestial-object auto-tracking photographing operation can be performed. This linear movement amount is determined by rotational center deviation amounts (Xd, Yd) which will be discussed later and the rotational angle θ.

In the present embodiment, the CPU 21 calculates the preliminary-tracking drive control data (dAs/dt, dhs/dt, dθ/dt) for the image sensor 13 from the photographing azimuth angle As and the photographing elevation angle hs that are input from the azimuth angle sensor 33 and the gravity sensor 35, respectively. "dAs/dt", "dhs/dt", "dθ/dt" designate an azimuth-angle-direction driving speed, an elevation-angle-direction driving speed and a rotational driving speed, respectively. The azimuth-angle-direction driving speed dAs/dt is data for moving the image sensor 13 in the X-direction, the elevation-angle-direction driving speed dhs/dt is data for moving the image sensor 13 in the Y-direction, and the rotational driving speed dθ/dt is data for rotating the image sensor 13 about a center thereof.

A manner of calculating the preliminary-tracking drive control data (dAs/dt, dhs/dt, dθ/dt) will be hereinafter discussed with reference to a celestial hemisphere shown in FIG. 7A and a spherical triangle shown in FIG. 7B.

Figure 7A:
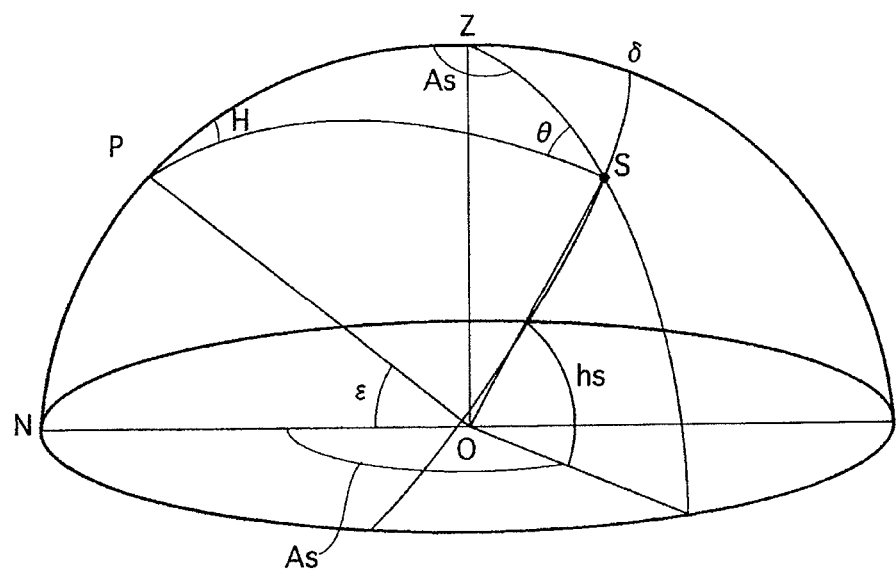
Figure 7B:
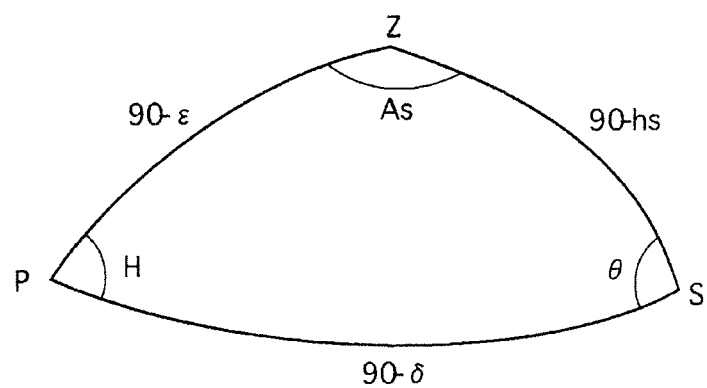

In the celestial diagrams shown in FIGS. 7A and 7B, P, Z, N, S, ε, As, hs, H and δ designate north celestial pole (NCP), zenith, true north, target celestial object, latitude at a photographic site, photographing azimuth angle (photographing azimuth angle input from the azimuth angle sensor 33), photographing elevation angle (photographing elevation angle input from the gravity sensor 35), hour angle of the target celestial object and declination of the target celestial object, respectively. The azimuth-angle-direction driving speed dAs/dt, the elevation-angle-direction driving speed dhs/dt and the rotational driving speed dθ/dt can be determined in a manner which will be discussed hereinafter.

In regard to the celestial diagrams shown in FIGS. 7A and 7B, the following equations are obtained:

$$\sin hs = \sin \epsilon \sin \delta + \cos \epsilon \cos \delta \times \cos H \quad (a)$$

$$\tan As = \sin H/(\cos \epsilon \tan \delta - \sin \epsilon \cos H) \quad (b)$$

$$\tan \theta = \sin H/(\tan \epsilon \cos \delta - \sin \delta \times \cos H) \quad (c)$$

$$dz/dt = \cos \delta \times \sin \theta \quad (d)$$

$$(z = 90 - hs)$$

$$dAs/dt = \cos \delta \times \cos \theta / \cos hs \quad (e)$$

$$d\theta/dt = -\cos \epsilon \cos As/\cos hs \quad (f)$$

The values to be obtained are: the declination δ of the target celestial object, the hour angle H of the target celestial object, the azimuth-angle-direction driving speed dAs/dt, the elevation-angle-direction driving speed dhs/dt and the rotational driving speed dθ/dt when the latitude c, the photographing azimuth angle As and the photographing elevation angle hs. These values are obtained by assigning the latitude c, the photographing azimuth angle As and the photographing elevation angle hs to equations (g) through (k) below:

$$\sin \delta = \sin hs \times \sin \epsilon + \cos hs \times \cos \epsilon \times \cos As \quad (g)$$

$$\tan H = \sin As/(\cos \epsilon \tan hs - \sin \epsilon \cos As) \quad (h)$$

$$dAs/dt = \sin \epsilon - \cos \epsilon \tan hs \times \cos As \quad (i)$$

$$dhs/dt = -\sin As \times \cos \epsilon \quad (j)$$

$$d\theta/dt = -\cos As \times \cos \epsilon / \cos hs \quad (k)$$

Figure 2A:
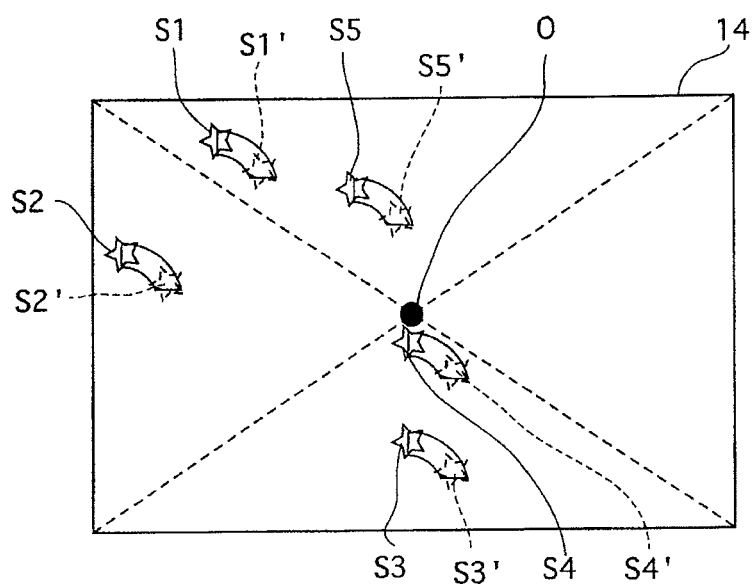
FIG. 2A is a diagram showing an entire image photographed in an astrophotography mode (celestial-object auto tracking photography mode) with errors in the photographing azimuth angle and the photographing elevation angle that are input from an azimuth angle sensor and a gravity sensor, respectively.
Figure 2B:
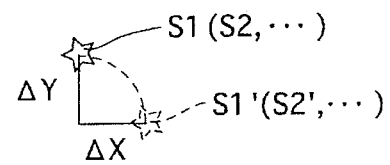
FIG. 2B is a diagram showing a part of the image shown in FIG. 2A which includes an image of a celestial object.

FIGS. 2A and 2B show the results obtained when the digital camera 10 performs a short-time exposure operation at each of the commencement point and the termination point of the preliminary tracking operation while performing the preliminary tracking operation using the preliminary-tracking drive control data (dAs/dt, dhs/dt, dθ/dt). In this preliminary tracking operation, the preliminary photographing operation is performed with more than one short-time exposure operation, not with a long-time exposure operation, so that celestial objects are photographed as dots. More specifically, in a single preliminary photographing operation, a first exposure (short-time exposure operation) is performed at the commencement of the preliminary tracking operation and a second exposure (short-time exposure operation) is performed at the termination of the same preliminary tracking operation. Because each of the first and second exposures is short in exposure time, it is desirable that the diaphragm 103 be fully open to increase the amount of exposure or the ISO sensitivity be increased as much as possible during each of the first and second exposures. An exposure with a short exposure time can be performed more than twice in a single preliminary tracking operation.

In the preliminary image shown in FIGS. 2A and 2B that is obtained by the preliminary photographing operation, a deviation amount (tracking error amount) ΔX in the X-direction (horizontal direction with respect to FIGS. 2A and 2B) and a deviation amount (tracking error amount) ΔY in the Y-direction (vertical direction with respect to FIGS. 2A and 2B) can be seen in each of the celestial object images S1 through S5. Namely, as shown in FIGS. 2A and 2B, due to the deviation amounts ΔX and ΔY, celestial object images S1' through S5' (which are the same celestial objects as those of the celestial object images S1 through S5, respectively) that are formed on the imaging surface 14 by the aforementioned first exposure that is performed at the commencement of the preliminary tracking operation do not match the celestial object images S1 through S5, respectively, that are formed on the imaging surface 14 by the aforementioned second exposure that is performed at the termination of the preliminary tracking operation. These deviation amounts ΔX and ΔY are caused by a deviation of the rotational center that is caused by a difference between the measured photographing azimuth angle As and photographing elevation angle hs and the actual orientation of the digital camera 10 due to errors such as those occurring in the measurement by the azimuth angle sensor 33 and the gravity sensor 35. If deviation amounts (Xd, Yd) of this rotational center can be determined, the celestial-object auto-tracking photographing operation can be performed with extremely high precision by correcting the photographing azimuth angle As and the photographing elevation angle hs with the errors ΔA and Δh and calculating the actual-tracking drive control data (dA/dt, dh/dt, dθ/dt) from the corrected (theoretically correct) photographing azimuth angle A (i.e., As+ΔA) and the corrected (theoretically correct) photographing elevation angle h (i.e., hs+Δh).

A manner of calculating the rotational center deviation amounts Xd and Yd from the deviation amounts ΔX and ΔY, respectively, which are obtained by the preliminary photographing operation, will be discussed hereinafter.

One celestial object is arbitrarily selected from the first preliminary image and the second preliminary image, which are obtained by the preliminary photographing operation, and the deviation amounts (moving amounts) ΔX and ΔY of this one celestial object in the X and Y directions are determined. In addition, the rotational angle θ of this one celestial object is calculated from the first preliminary image and the second preliminary image. Since those moving amounts ΔX and ΔY correspond to those of the point PA of the aforementioned equation (III) or those of the point PB of the aforementioned equation (IV), the following equations (V) and (VI) are obtained:

$$\Delta X = Xd - Xd \cos \theta + Yd \sin \theta \quad (V)$$

$$\Delta Y = Yd - Xd \sin \theta - Yd \cos \theta \quad (VI)$$

wherein ΔX represents the amount of deviation in the X-coordinate of the image of the arbitrarily selected celestial object in the first preliminary image from the image of the corresponding celestial object in the second preliminary image;

ΔY represents the amount of deviation in the Y-coordinate of the image of the arbitrarily selected celestial object in the first preliminary image from the image of the corresponding celestial object in the second preliminary image;

Xd designates the rotational center deviation amount of the X-coordinate position (the amount of deviation of the X-coordinate position of the center point of the image of that is actually captured by the camera (photographic apparatus) 10 with respect to the position of the center point of the image that is calculated based on the input photographing azimuth angle information A and the input photographing elevation angle information h of the digital camera (photographic apparatus) 10);

Yd designates the rotational center deviation amount of the Y-coordinate position (the amount of deviation of the Y-coordinate position of the center point of the image that is actually captured by the camera (photographic apparatus) 10 with respect to the position of the center point of the image that is calculated based on the input photographing azimuth angle information A and the input photographing elevation angle information h of the digital camera (photographic apparatus) 10); and θ represents the rotational angle of the arbitrarily selected celestial object image in each of the first preliminary image and the second preliminary image with the center of the imaging surface defined as a rotational center.

If the aforementioned equations (V) and (VI) are solved with respect to Xd and Yd, the following equations are obtained:

$$Xd = \Delta X/2 - \Delta Y \sin \theta/(2(1-\cos \theta))$$

$$Yd = \Delta X \sin \theta/(2(1-\cos \theta)) + \Delta Y/2$$

As described above, the rotational center deviation amounts Xd and Yd can be calculated from the deviation amounts ΔX and ΔY and the rotational angle θ that are obtained from the first preliminary image and the second preliminary image. Consequently, if the tracking control is performed with the rotational center shifted by the rotational center deviation amounts Xd and Yd and with the X-direction moving amount ΔX, the Y-direction moving amount ΔY and the rotational angle θ of the image sensor 13 (and hence, image that is actually captured by the photographic apparatus) remaining unchanged, a precise tracking astrophotography with (substantially) no error becomes possible.

In addition, the photographing azimuth angle As and the photographing elevation angle hs can be corrected with the rotational center for use in control remaining unchanged as a sensor center (calculated image center point). From the above calculated rotational center deviation amounts Xd and Yd, the deviation amount ΔA in the photographing azimuth angle As and the deviation amount Δh in the photographing elevation angle information hs can be expressed as follows:

$$\Delta h = \arctan(Yd/f)$$

$$\Delta A = \arccos((\cos(\arctan(Xd/f)) - \cos^2(h + \arctan(Yd/f)/2))/\cos^2(h + \arctan(Yd/f)/2))$$

The deviation amounts ΔA and Δh are correction amounts for the photographing azimuth angle As and the photographing elevation angle information hs, which are obtained by the azimuth angle sensor 33 and the gravity sensor 35, respectively. With this, the accurate photographing azimuth angle A (i.e., As+ΔA) and the accurate photographing elevation angle h (i.e., hs+Δh) can be calculated by correcting the photographing azimuth angle As and the photographing elevation angle information hs, which are respectively obtained by the azimuth angle sensor 33 and the gravity sensor 35 and each of which may include an error, with the deviation amounts ΔA and Δh.

The fact that the aforementioned equations (g), (h), (i), (j) and (k) are valid will be discussed (proven) hereinafter.

In a spherical triangle ΔZPS on the celestial hemisphere shown in FIG. 7A, the following three equations are valid according to the spherical law of cosines.

$$\sin(90-h) \times \sin \theta = \sin(90-\epsilon) \times \sin H$$

$$\sin(90-h) \times \cos \theta = \sin(90-\delta) \times \cos(90-\epsilon) \cos(90-\delta) \times \sin(90-\epsilon) \times \cos H$$

$$\cos(90-h) = \cos(90-\epsilon) \times \cos(90-\delta) + \sin(90-\epsilon) \times \sin(90-\delta) \times \cos H$$

If each of the these three equations is modified, the following equations (1), (2) and (3) are obtained.

$$\cos h \times \sin \theta = \cos \epsilon \times \sin H \quad (1)$$

$$\cos h \times \cos \theta = \cos \delta \times \sin \epsilon - \sin \delta \times \cos \epsilon \times \cos H \quad (2)$$

$$\sin h = \sin \epsilon \times \sin \delta + \cos \epsilon \times \cos \delta \times \cos H \quad (3)$$

The following equation (4) is obtained from the aforementioned equations (1) and (2). This equation (4) is equivalent to the aforementioned equation (c).

$$\tan \theta = \cos \varepsilon \times \sin H / (\cos \delta \times \sin \varepsilon - \sin \delta \times \cos \varepsilon \times \cos H) \quad (4)$$

$$= \sin H / (\tan \varepsilon \times \cos \delta - \sin \delta \times \cos H)$$

If both sides of each of equations (1) and (2) are differentiated with respect to t, the following equations (5) and (6) are obtained.

$$-\sin h \times \sin \theta \times dh/dt + \cos h \times \cos \theta \times d\theta/dt = \cos \epsilon \times \cos H \quad (5)$$

$$-\sin h \times \cos \theta \times dh/dt - \cos h \times \sin \theta \times d\theta/dt = \cos \epsilon \times \sin \delta \times \sin H \quad (6)$$

If these equations (5) and (6) are solved in terms of dh/dt and dθ/dt, the following equation is obtained:

$$-\sin h \times \cos \theta \times dh/dt + \cos h \times \cos \theta \times d\theta/dt = \cos \theta \times \cos \epsilon \times \cos H$$

This equation is equal to the right side of equation (5) multiplied by cos θ.

$$-\sin h \times \sin \theta \times dh/dt - \cos h \times \sin \theta \times d\theta/dt = \sin \theta \times \cos \epsilon \times \sin \delta \times \sin H$$

This equation is equal to the right side of equation (6) multiplied by sin θ. If the right side and the left side of the latter equation of the aforementioned two equations are respectively subtracted from the right side and the left side of the former equation, the following equations are obtained:

$$\cos h \times d\theta/dt \times (\cos^2 \theta + \sin^2 \theta) = \cos \theta \times \cos \epsilon \times \cos H - \cos \theta \times \cos \epsilon \times \sin \delta \times \sin H$$

$$\cos h \times d\theta/dt = (\cos \theta \times \cos H - \sin \theta \times \sin \delta \times \sin H) \times \cos \epsilon$$

Accordingly, dθ/dt is expressed by the following equation (7):

$$d\theta/dt = (\cos \theta \times \cos H - \sin \theta \times \sin \delta \times \sin H) \times \cos \epsilon / \cos h \quad (7)$$

In addition, the following two equations hold true:

$$-\sin h \times \sin \theta \times dh/dt + \cos h \times \cos \theta \times d\theta/dt = \sin \theta \times \cos \epsilon \times \cos H$$

$$-\sin h \times \cos \theta \times \cos \theta \times dh/dt - \cos h \times \sin \theta \times \cos \theta = \theta \times d\theta/dt = \cos \theta \times \cos \epsilon \sin \delta \times \sin H$$

The former equation is equivalent to the right side of equation (5) multiplied by sin θ, and the latter equation equivalent to the right side of equation (6) multiplied by cos θ. Therefore, if the right side and the left side of the latter equation of the aforementioned two equations are respectively added to the right side and the left side of the former equation, the following equations are obtained:

$$-\sin h \times dh/dt \times (\sin^2\theta + \cos^2\theta) = \sin \theta \times \cos \epsilon \times \cos H + \cos \theta \times \cos \epsilon \sin \delta \times \sin H$$

$$-\sin h \times dh/dt = (\sin \theta \times \cos H + \cos \theta \times \sin \delta \times \sin H) \times \cos \epsilon$$

Accordingly, dh/dt is expressed by the following equation (8):

$$dh/dt = -(\sin \theta \times \cos H + \cos \theta \times \sin \delta \times \sin H) \times \cos \epsilon / \sin h \quad (8)$$

In the spherical triangle ΔZPS, the following two equations hold true according to the spherical law of cosines:

$$\sin A \times \cos(90-h) = \sin \theta \times \cos H + \cos \theta \times \cos(90-\delta) \times \sin H$$

$$\cos A = \cos \theta \times \cos H - \sin \theta \times \cos(90-\delta) \times \sin H$$

These two equations can be modified to obtain the following equations (9) and (10):

$$\sin A \times \sin h = \sin \theta \times \cos H + \cos \theta \times \sin \delta \times \sin H \quad (9)$$

$$\cos A = -\cos \theta \times \cos H + \sin \theta \times \sin \delta \times \sin H \quad (10)$$

If equations (10) and (9) are substituted into equations (7) and (8), respectively, the following equations (11) and (12) that are respectively identical to the aforementioned equations (k) and (j) are obtained.

$$d\theta/dt = -\cos A \times \cos \epsilon / \cos h \quad (11)$$

$$dh/dt = -\sin A \times \cos \epsilon \quad (12)$$

In the spherical triangle ΔZPS, the following equation is obtained:

$$\sin(90-h) \times (-\cos A) = \sin(90-\epsilon) \times \cos(90-\delta) - \cos(90-\epsilon) \times \sin(90-\delta) \times \cos H$$

This equation can be modified to obtain the following equation:

$$-\cos A = (\sin \epsilon \times \cos \theta \times \cos H - \cos \epsilon \sin \delta)/\cos h$$

If this equation is substituted into equation (11), the following equation (13) is obtained.

$$d\theta/dt = (\sin \epsilon \times \cos \delta \times \cos H - \cos \epsilon \sin \delta) \times \cos \epsilon / \cos^2 h \quad (13)$$

In the spherical triangle ΔZPS, the following equation is obtained:

$$\cos(90-\delta) = \cos(90-\epsilon) \times \cos(90-+\sin(90-\epsilon) \times \sin(90-h) \times (-\cos A)$$

This equation can be modified to obtain the following equation (14):

$$\sin \delta = \sin \epsilon \sin h + \cos \epsilon \cos h \times \cos A \quad (g) \quad (14)$$

Consequently, the aforementioned equation (g) is obtained.

Additionally, in the spherical triangle ΔZPS, the following equation is obtained:

$$\cos(90-h) = \cos(90-\delta) \times \cos(90-\epsilon) + \sin(90-\delta) \times \sin(90-\epsilon) \times \cos H$$

If the following equation "sin(90-δ)=sin(90-h)×sin A/sin H" is substituted into this equation, the following equation is obtained:

$$\cos(90-h) = \cos(90-\delta) \times \cos(90-\epsilon) \sin(90-h) \times \sin A \times \sin(90-\epsilon) \times \cos H / \sin H$$

By modifying this equation, the following equation is obtained:

$$\sin h = \sin \delta \times \sin \epsilon + \cos h \times \sin A \times \cos \epsilon / \tan H$$

If equation (14) is substituted into this equation, the following equations are obtained:

$$\sin h = \sin h \times \sin^2 \epsilon + \cos \epsilon \sin \epsilon \cos h \times \cos A + \cos h \times \sin A \times \cos \epsilon / \tan H$$

$$\cos h \times \sin A \times \cos \epsilon / \tan H = \sin h \times (1-\sin^2 E) - \cos \epsilon \sin \epsilon \cos h \times \cos A$$

$$\tan H = \cos h \times \sin A \times \cos \epsilon / (\sin h \times \cos^2 \epsilon + \cos \epsilon \sin \epsilon \cos h \times \cos A)$$

$$\tan H = \sin A / (\cos \epsilon \times \tan h - \sin \epsilon \cos A) \quad (h)$$

Consequently, the aforementioned equation (h) is obtained.

By modifying equation (a), the following equation (15) is obtained:

$$\sin \delta = (\sin h - \cos \epsilon \cos \delta \times \cos H)/\sin \epsilon \quad (15)$$

In the spherical triangle ΔZPS, the following equation is obtained:

$$\sin(90-\delta) \times \cos H = \cos(90-h) \times \sin(90-\epsilon) + \sin(90-h) \times \cos(90-\epsilon) \times \cos A$$

Therefore, the following equation (16) is obtained:

$$\cos \delta \times \cos H = \sin h \times \cos \epsilon - \cos h \times \sin \epsilon \cos A \quad (16)$$

If equation (16) is substituted into equation (15), the following equations are obtained, thus being equal to equations (14) or (g).

$$\sin \delta = (\sin h - \sin h \times \cos^2 \epsilon + \cos h \times \sin \epsilon \cos \epsilon \cos A)/\sin \epsilon$$

$$\sin \delta = (\sin h \times \sin^2 \epsilon + \cos h \times \sin \epsilon \cos \epsilon \cos A)/\sin \epsilon$$

$$\sin \delta = \sin h \times \sin \epsilon + \cos h \times \cos \epsilon \cos A$$

Equation (b) is modified as follows:

$$-\cos A/\sin A = \sin \epsilon/\tan H - \cos \epsilon \tan \delta/\sin H$$

$$\tan H = \sin \epsilon/(-\cos A/\sin A + \cos \epsilon \tan \delta/\sin H)$$

This equation is modified as follows by substituting an equation "sin H=sin A×sin(90-h)/sin(90-δ)=sin A×cos h/cos h" into the aforementioned equation.

$$\tan H = \sin \epsilon/(-\cos A/\sin A + \cos \epsilon \tan \delta \times \cos \delta/\sin A \times \cos h)$$

$$\tan H = \sin \epsilon/(-\cos A/\sin A + \cos \epsilon \sin \delta/(\sin A \times \cos h))$$

$$\tan H = \sin \epsilon \sin A/(-\cos A + \cos \epsilon \sin \delta/\cos h)$$

If this equation is modified by substitution of equation (14) thereinto, the following equations are obtained:

$$\tan H = \sin \epsilon \sin A/(-\cos A + (\cos \epsilon \sin h \times \sin \cos^2 \epsilon \times \cos h \times \cos A)/\cos h)$$

$$\tan H = \sin \epsilon \sin A/(-\cos A + \cos \epsilon \sin \epsilon \tan h + \cos^2 \epsilon \cos A)$$

$$\tan H = \sin \epsilon \times \sin A/(-\cos A \times \sin^2 \epsilon + \cos \epsilon \times \sin \epsilon \times \tan h)$$

$$\tan H = \sin A/(-\cos A \times \sin F + \cos \epsilon \times \tan h) \quad \text{(h)}$$

Consequently, the resultant equation is coincident with the aforementioned equation (h).

In the spherical triangle $\triangle ZPS$, the following equations are obtained:

$$\sin(90-\delta) \times \cos \theta = \cos(90-\epsilon) \times \sin(90-h) + \sin(90-\epsilon) \times \cos(90-h) \times \cos A$$

$$\cos \delta \times \cos \theta = \sin \epsilon \times \cos h - \cos \epsilon \times \sin h \times \cos A$$

If this equation is substituted into equation (e), the following equations are obtained:

$$dA/dt = (\sin \epsilon \times \cos h - \cos \epsilon \times \sin h \times \cos A)/\cos h$$

$$dA/dt = \sin \epsilon - \cos \epsilon \times \tan h \times \cos A \quad \text{(i)}$$

Consequently, the aforementioned (i) is obtained.

Equation (g) is modified as follows:

$$\sin h \times \sin \epsilon = -\cos h \times \cos \epsilon \times \cos A + \sin \delta$$

This equation is differentiated with respect to t. However, it is deemed that the latitude $\epsilon$ and the declination $\delta$ at a photographic site are constant.

$$\cos h \times \sin \epsilon \times dh/dt = \cos \epsilon \times \sin h \times \cos A \times dh/dt - \cos \epsilon \times \cos h \times \sin A \times dA/dt$$

$$dA/dt = -(\cos h \times \sin \epsilon - \cos \epsilon \times \sin h \times \cos A) \times dh/dt/(\cos \epsilon \times \cos h \times \sin A)$$

If equation (j) is substituted into this equation, the following equations are obtained:

$$dA/dt = (\cos h \times \sin - \cos \epsilon \times \sin h \times \cos A) \times \sin A \times \cos \epsilon/(\cos \epsilon \times \cos h \times \sin A)$$

$$dA/dt = \sin \epsilon - \cos \epsilon \times \tan h \times \cos A \quad \text{(i)}$$

thus coinciding with the aforementioned equation (i).

According to the above described principle, the preliminary-tracking drive control data (dAs/dt, dhs/dt, dθ/dt) for performing the preliminary tracking operation can be calculated from the photographing azimuth angle As and the photographing elevation angle hs according to the aforementioned equations (i), (j) and (k). In addition, the actual-tracking drive control data (dA/dt, dh/dt, dθ/dt) for use in performing an actual tracking operation can be calculated from the corrected photographing azimuth angle A (i.e., As+ΔA) and the corrected photographing elevation angle h (i.e., hs+Δh) according to the aforementioned equations (i), (j) and (k).

Figure 8:
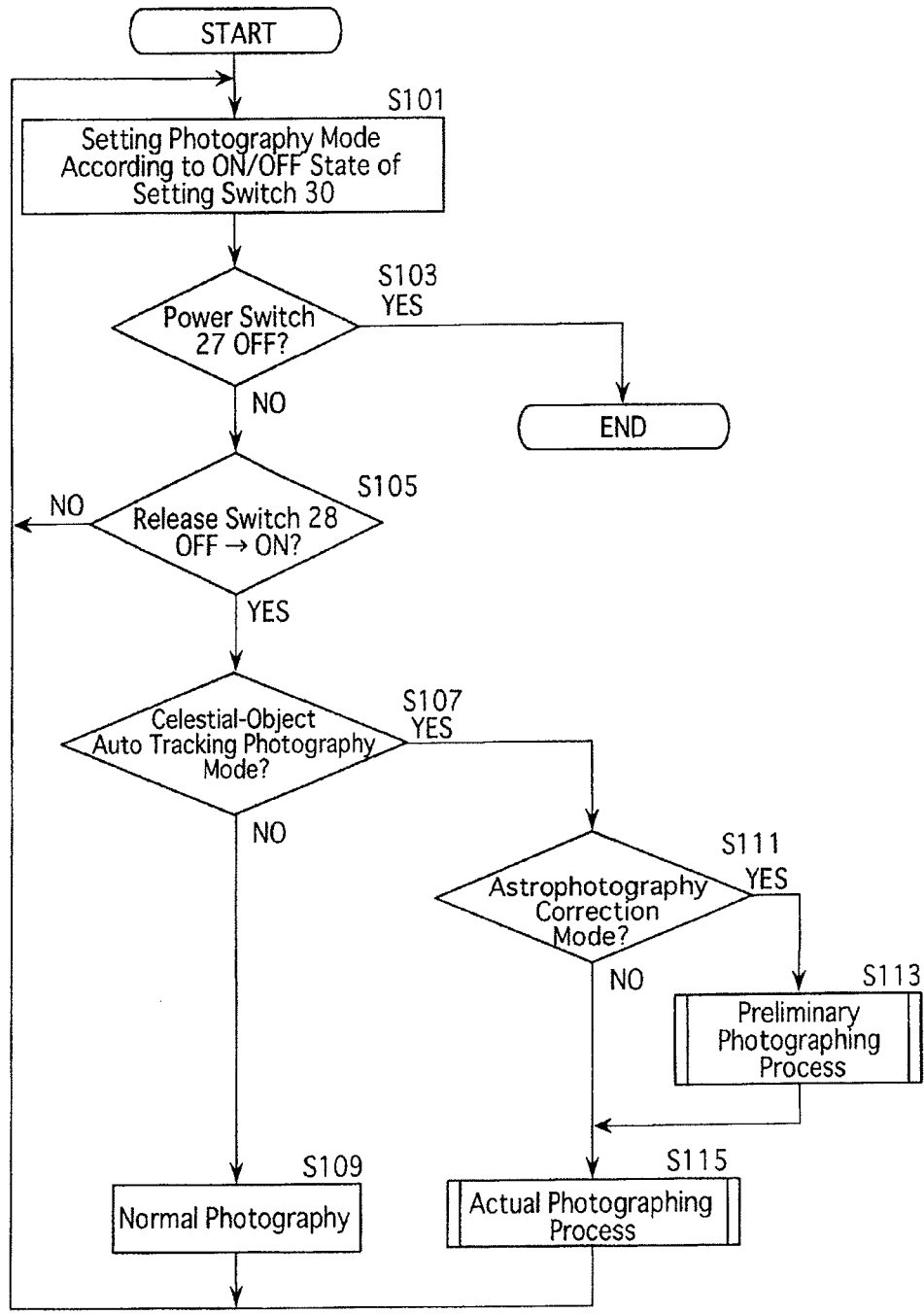
FIG. 8 is a flow chart showing a main process performed when a picture is taken by the digital camera in either a normal photography mode or an astrophotography mode (celestial-object auto tracking photography mode)
Figure 9:
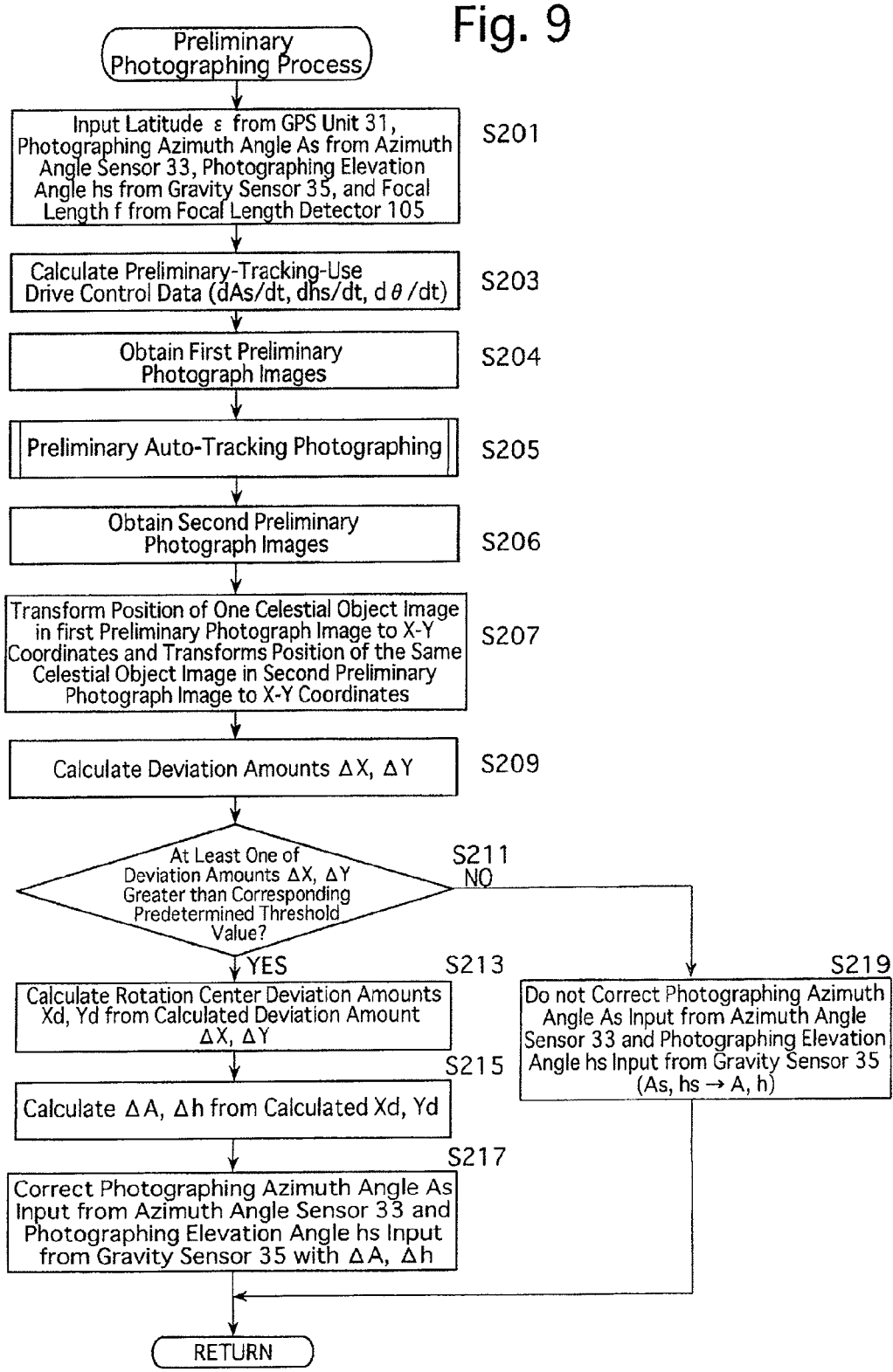
FIG. 9 is a flow chart showing a series of operations performed in the preliminary photographing operation (step S113) shown in FIG. 8 in the celestial-object auto-tracking photographing mode.
Figure 10:
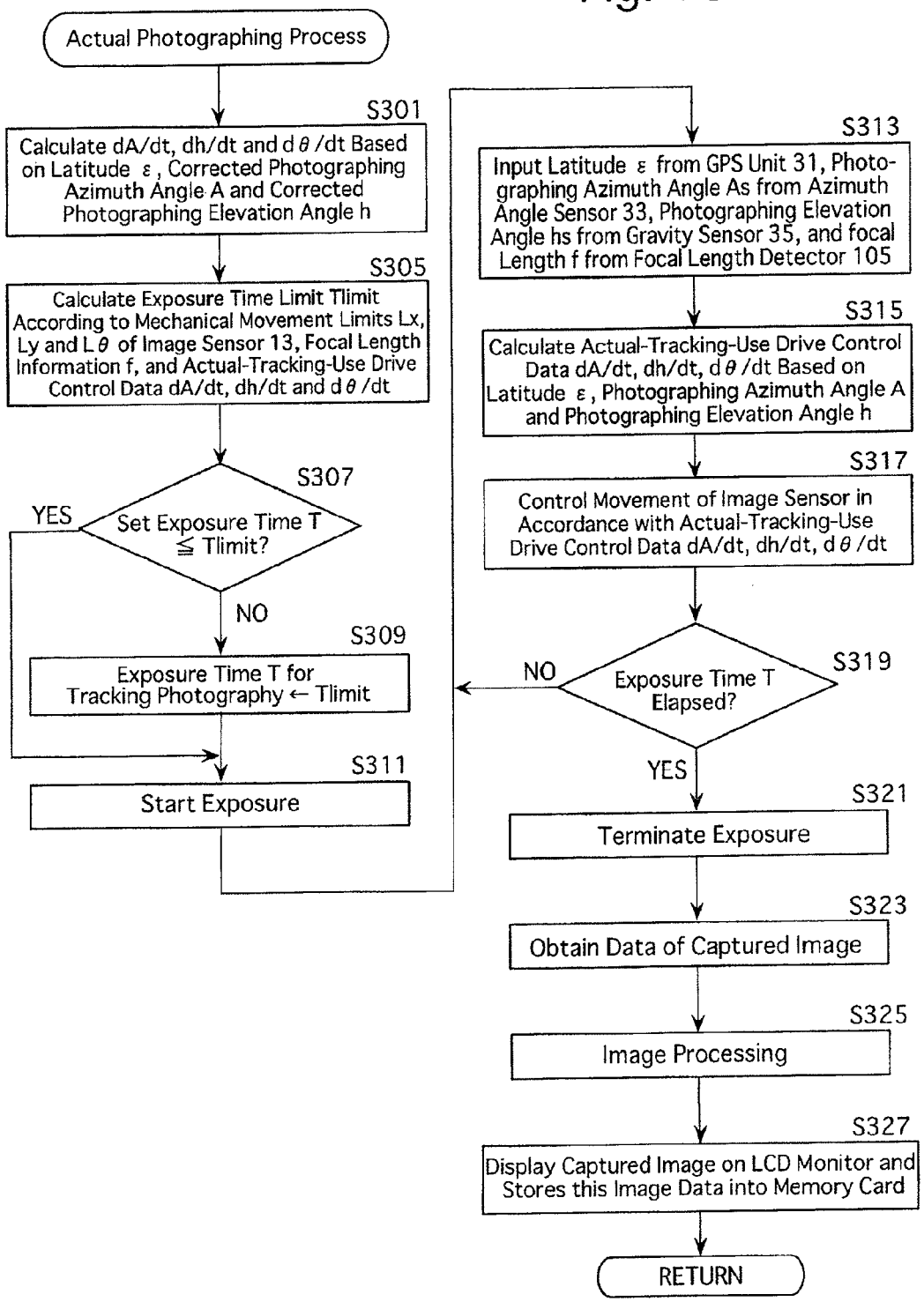
FIG. 10 is a flow chart showing a series of operations performed in the actual photographing operation (S115) shown in FIG. 8 in the celestial-object auto-tracking photographing mode.

Astrophotography (celestial-object auto tracking photography) using the digital camera 10 will be hereinafter discussed with reference to the flow charts shown in FIGS. 8 through 10. As shown in FIG. 8, upon the release switch 28 being turned ON with the power switch 27 ON, a normal photography (normal exposure operation) is performed if the digital camera 10 is in a normal photography mode (not the celestial-object auto tracking photography mode) that is set by turning OFF the setting switch 30 (step S101, NO at step S103, YES at step S105, NO at step S107, and step S109). Control ends upon the power switch 27 being turned OFF (YES at step S103, END). No photographing operation is performed unless the release switch 28 is turned ON (NO at step S105).

In a state where the power switch 27 is in the ON state and the digital camera 10 is in the celestial-object auto tracking photography mode that is set by the setting switch 30 (S101, NO at step S103), the celestial-object auto-tracking photographing operation according to the present embodiment is performed upon the release switch 28 being turned ON with a target celestial object(s) or star(s) captured on the image sensor 13 (YES at step S105, YES at step 107).

If astrophotography is carried out with the digital camera 10 not in an astrophotography correction mode (the celestial-object auto tracking photography mode in which the preliminary-tracking drive control data and the actual-tracking drive control data are used) (NO at step S111, S115), since the image sensor 13 (the imaging surface 14) remains stationary at the initial position thereof, the resultant images thereof become linearly or curvilinearly elongated light trial images due to diurnal motion of the celestial objects.

On the other hand, if astrophotography is carried out with the digital camera 10 in the astrophotography correction mode (the celestial-object auto tracking photography mode in which the preliminary-tracking drive control data and the actual-tracking drive control data are used) (YES at step S111), a preliminary photographing operation is performed according to the preliminary-tracking drive control data (step S113) and thereafter the actual photographing operation (the celestial-object auto-tracking photographing operation) is performed according to the actual-tracking drive control data (step S115).

[Preliminary Photographing Operation]

The preliminary photographing operation performed at step S113 in which the preliminary-tracking drive control data is calculated will be hereinafter discussed in detail with reference to the flow chart shown in FIG. 9.

In the preliminary photographing operation, first the CPU 21 inputs the latitude information $\epsilon$ from the GPS unit 31, inputs the photographing azimuth angle As and the photographing elevation angle hs from the azimuth angle sensor 33 and the gravity sensor 35, respectively, and inputs the focal length information f from the focal length detector 105 (step S201).

Subsequently, the CPU 21 calculates the preliminary-tracking drive control data (dAs/dt, dhs/dt, dθ/dt) for use in performing the preliminary tracking operation based on the latitude information $\epsilon$, the photographing azimuth angle As, the photographing elevation angle hs and the focal length information f that are input at step S201 (step S203).

Subsequently, upon obtaining the first preliminary image (step S204), the CPU 21 performs the preliminary tracking operation (step S205) by (linearly and rotationally) moving the image sensor 13 based on the calculated preliminary-tracking drive control data (dAs/dt, dhs/dt, dθ/dt). This preliminary tracking operation (step S205) is to the same as the tracking operation of a later-described actual photographing operation (steps S305 through S319) shown in FIG. 10 except that the preliminary-tracking drive control data (dAs/dt, dhs/dt, dθ/dt) is substituted for the actual-tracking drive control data (dA/dt, dh/dt, dθ/dt). Namely, similar to the actual auto-tracking photographing operation (the celestial-object auto-tracking photographing operation), the CPU 21 controls the image sensor 13 to linearly and rotationally move according to the calculated preliminary-tracking drive control data (dAs/dt, dhs/dt, dθ/dt) until a lapse of a set exposure time T. Upon the set exposure time T lapsing, the CPU obtains the second preliminary image (step S206). Upon completion of the preliminary tracking operation (step S205), the CPU 21 brings the image sensor 13 back to the initial position thereof. Note that during this preliminary tracking operation, an exposure can be continuously performed during the preliminary tracking operation (step S205) from when the first preliminary image is obtained (step S204) until when the second preliminary image is obtained (step S206) so as to obtain a preliminary-tracking photographic image. In this case, the first preliminary image and the second preliminary image can be extracted from this preliminary-tracking photographic image.

Subsequently, the CPU 21 converts the position of one of the celestial object images contained in the first preliminary image to the X-Y coordinates in the X-Y coordinate system and converts the position of the corresponding (same) celestial object image contained in the second preliminary image to the X-Y coordinates in the X-Y coordinate system (step S207) and calculates the deviation amounts ΔX, ΔY of that celestial object image (step S209).

Subsequently, it is determined whether or not at least one of the calculated deviation amount ΔX and the calculated deviation amount ΔY exceeds a corresponding predetermined threshold value (step S211).

If determining that at least one of the calculated deviation amount ΔX and the calculated deviation amount ΔY exceeds the corresponding predetermined threshold value (if YES at step S211), the CPU 21 calculates the rotational center deviation amounts Xd, Yd from the calculated deviation amount ΔX, ΔY (step S213). Thereafter, from these rotational center deviation amounts Xd, Yd, the CPU 21 calculates the amount of deviation (error) ΔA between the theoretically-correct photographing azimuth angle A and the photographing azimuth angle As that is input from the azimuth angle sensor 33 and the amount of deviation (error) Δh between the theoretically-correct photographing elevation angle h and the photographing elevation angle hs that is input from the gravity sensor 35 (step S215). Thereafter, the CPU 21 corrects the photographing azimuth angle As and the photographing elevation angle hs, which are respectively input from the azimuth angle sensor 33 and the gravity sensor 35, with the deviation amounts ΔA and Δh (step S217). Namely, the CPU 21 obtains the accurate photographing azimuth angle A (i.e., As+ΔA) and the accurate photographing elevation angle h (i.e., hs+Δh), in which the detection error thereof via the azimuth angle sensor 33 and the gravity sensor 35 have been corrected.

If it is determined at step S211 that neither of the calculated deviation amount ΔX and the calculated deviation amount ΔY exceeds the corresponding predetermined threshold value (if NO at step S211), the CPU 21 does not correct either the photographing azimuth angle As or the photographing elevation angle hs, which are respectively input from the azimuth angle sensor 33 and the gravity sensor 35, and substitutes the photographing azimuth angle As and the photographing elevation angle hs for the accurate photographing azimuth angle A and the accurate photographing elevation angle h, respectively (step S219). If a preliminary-tracking photographic image is obtained by performing a continuous exposure during the preliminary auto-tracking photographing operation (step S205) with the calculated deviation amount ΔX and the calculated deviation amount ΔY being determined as not exceeding the corresponding predetermined threshold value (if NO at step S211), it is possible to display the preliminary-tracking photographic image (that is obtained by preliminary tracking operation (step S205)) as an actual image on the LCD monitor 23, and to store this image data onto the memory card 25 as an image file of a predetermined format.

[Actual Photographing Operation]

The actual photographing operation (step S115) in the present embodiment will be hereinafter discussed in detail with reference to the flow chart shown in FIG. 10.

In the actual photographing operation, first the CPU 21 calculates the actual-tracking drive control data (dA/dt, dh/dt, dθ/dt) based on the latitude information ε that is input from the GPS unit 31 in the preliminary photographing operation and either the accurate photographing azimuth angle A and the accurate photographing elevation angle h which are obtained by correcting the photographing azimuth angle As and the photographing elevation angle hs input in the preliminary photographing operation with the errors ΔA and Δh at step S217 or the photographing azimuth angle As and the photographing elevation angle hs input in the preliminary photographing operation which are the substitutions for the accurate photographing azimuth angle A and the accurate photographing elevation angle h at step S219 (step S301).

Subsequently, the CPU 21 calculates a longest exposure time (exposure time limit) Tlimit according to the actual-tracking drive control data (dA/dt, dh/dt, dθ/dt), the focal length information f that is input from the focal length detector 105 in the preliminary photographing operation and mechanical movement limits Lx, Ly and Lθ in the range of movement of the image sensor 13 that is moved by the image sensor drive unit 15 (step S305).

Subsequently, the CPU 21 determines whether or not the exposure time T, which is arbitrarily set by the user, is within (less than or equal to) the longest exposure time Tlimit that is calculated at step S305 (step S307). If the exposure time T is determined at step S307 as being within the longest exposure time Tlimit (if YES at step S307), the CPU 21 sets the exposure time T as an exposure time for the celestial-object auto-tracking photographing operation. On the other hand, if the exposure time T is determined at step S307 as exceeding the longest exposure time Tlimit (if NO at step S307), the CPU 21 sets the longest exposure time Tlimit as an exposure time for the celestial-object auto-tracking photographing operation (step S309). Subsequently, the CPU 21 controls the operation of a shutter (not shown) so that the shutter opens for the set exposure time to start capturing an image via the image sensor 13 (step S311). Although an image is normally captured with the diaphragm 103 fully open, the aperture size of the diaphragm 103 can be arbitrarily set by the user.

Subsequently, until the set exposure time T elapses, the CPU 21 continues the exposure operation while controlling the linear movement and the rotational movement of the image sensor 13 in accordance with the calculated actual-tracking drive control data (dA/dt, dh/dt, dθ/dt) (step S317, NO at step S319). This makes capturing of a still image of a celestial object(s) possible in a state where each celestial object appears stationary in long exposure astrophotography simply by performing an exposure with the digital camera 10 fixed with respect to the ground (earth). During this exposure time, the CPU 21 can calculate and update the actual-tracking drive control data (dA/dt, dh/dt, dθ/dt) based on the latitude information ε, the photographing azimuth angle information As and the photographing elevation angle information hs that are input from the GPS unit 31, the azimuth angle sensor 33 and the gravity sensor 35, respectively (steps S217, S219, S313 and S315).

Subsequently, after a lapse of the exposure time T (YES at step S319), the CPU 21 closes the shutter (not shown) to terminate the exposure operation (step S321). Thereafter, the CPU 21 reads out image data on the captured image from the image sensor 13 (step S323) and performs image processing operations such as a white balance adjustment operation and an image processing operation for converting the format type into a predetermined type of format (step S325). Lastly, the CPU 21 causes the image data on the captured image, on which the aforementioned image processing operations have been performed, to be displayed on the LCD monitor 23, stores this image data into the memory card 25 as an image file of a predetermined format (step S327), and control returns.

As described above, according to the above described method of automatically tracking and photographing celestial objects, and a photographic apparatus that employs this method, according the present invention, the preliminary-tracking drive control data (dAs/dt, dhs/dt, dθ/dt), which is for use in performing a preliminary tracking operation, is calculated based on the photographing azimuth angle information As and the photographing elevation angle information hs; the first preliminary image and the second preliminary image, which respectively correspond to the commencement point and the termination point of the preliminary tracking operation are obtained; the amount of deviation (ΔX, ΔY) between the celestial object image in the first preliminary image and the corresponding celestial object image in the second preliminary image is calculated; from the amount of deviation, the actual-tracking drive control data (dA/dt, dh/dt, dθ/dt), which is for use in performing an actual tracking operation, is calculated so as to cancell out the deviation amount (ΔX, ΔY); and the celestial-object auto-tracking photographing operation is performed based on the actual-tracking drive control data. Accordingly, a high precision celestial-object auto-tracking photographing operation can be achieved by calculating the actual-tracking drive control data (dA/dt, dh/dt, dθ/dt) even if the input data on the photographing azimuth angle As and the photographing elevation angle hs are low in accuracy, which makes it possible to capture a still image of a celestial object(s) in a state where each celestial object appears stationary even in long exposure astrophotography.

In the above described embodiment, the image sensor drive unit 15 physically linearly-moves the image sensor 13 and rotates the image sensor 13 by drive control of the CPU 21. However, instead of physically moving the image sensor 13 in this manner, by partly trimming the entire imaging area of the image sensor 13 (i.e., the entire part of the imaging surface 14) electronically to define the remaining part (non-trimmed part) of the imaging area of the image sensor 13 as a trimmed imaging area, it is possible to perform an exposure while linearly moving this trimmed imaging area in directions orthogonal to the optical axis LO of the photographing optical system 101 and rotating the trimmed imaging area about an axis parallel to the optical axis LO according to the actual-tracking drive control data (dA/dt, dh/dt, dθ/dt). In this manner, it is possible to perform an exposure while linearly moving the aforementioned trimmed imaging area in directions orthogonal to the optical axis LO of the photographing optical system 101 and rotating the trimmed imaging area about an axis parallel to the optical axis LO by sending a trimming command signal to the image sensor 13 periodically at a predetermined drive frequency by the CPU 21 in FIG. 1.

Although the above described embodiment of the digital camera 10 is equipped with the image sensor drive unit 15 that moves the image sensor 13 in directions orthogonal to an optical axis and rotates the image sensor 13 about an axis parallel to this optical axis, the digital camera according to the present invention can be alternatively configured even if the image sensor drive unit 15 is omitted and replaced by a combination of an image shake corrector (anti-shake apparatus) provided in the photographing lens 101 with an image shake correcting lens for moving object images on the image sensor 13 and an image sensor rotating mechanism for rotating the image sensor 13 or with the aforementioned manner of electronically rotating the aforementioned trimmed imaging area.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A method of automatically tracking and photographing a celestial object which moves relative to a photographic apparatus due to diurnal motion so that an image of the celestial object that is formed on an imaging surface of an image sensor via a photographing optical system of the photographic apparatus becomes stationary relative to a predetermined imaging area of the image sensor during a celestial-object auto-tracking photographing operation, the method comprising:

obtaining azimuth information, with respect to the photographic apparatus, of the celestial object;

calculating first-tracking drive control data for performing a first-tracking photographing operation based on the azimuth information;

performing the first-tracking photographing operation, during a first predetermined exposure time, based on the first-tracking drive control data;

obtaining, after the first-tracking photographing operation based on the first-tracking drive control data finishes, a first image, upon lapse of a predetermined time after the first predetermined exposure time, and a second image, wherein the first image and the second image respectively correspond to a beginning and an ending of images taken by the first-tracking photographing operation;

calculating an amount of deviation between a celestial object image in the first image and a corresponding celestial object image in the second image;

judging, in accordance with a comparison between the deviation amount and a predetermined threshold value, whether a second-tracking photographing operation, based on a second-tracking drive control data obtained by correcting said first-tracking drive control data, with a second predetermined exposure time, is to be performed, and in response to a result of the judging that said second-tracking photographing operation is to be performed, an actual photographing operation is performed with said second-tracking drive control data obtained by correcting said first-tracking drive control data.

2. The method according to claim 1, wherein, when the second-tracking photographing operation is to be performed, the method further comprises:

calculating, based on the amount of deviation, the second-tracking drive control data for performing the actual photographing operation with the deviation amount cancelled; and performing the actual photographing operation based on the second-tracking drive control data, and wherein calculating the second-tracking drive control data comprises correcting the first-tracking drive control data with the deviation amount to calculate the second-tracking drive control data.

3. The method according to claim 1, wherein performing the first-tracking photographing operation comprises performing an exposure operation while moving the predetermined imaging area of the image sensor and the image of the celestial object that is formed on the imaging surface of the image sensor.

4. The method according to claim 2,
wherein calculating the second-tracking drive control data further comprises:
correcting the azimuth information based on the deviation amount; and
calculating the second-tracking drive control data for moving the predetermined imaging area of the image sensor and the image of the celestial object that is formed on the imaging surface of the image sensor based on the corrected azimuth information.

5. The method according to claim 2, further comprising:
calculating the second-tracking drive control data by moving the predetermined imaging area of the image sensor and the image of the celestial object that is formed on the imaging surface of the image sensor.

6. The method according to claim 2,
wherein the judging comprises determining whether the deviation amount exceeds the predetermined threshold value, and
wherein calculating the second-tracking drive control data comprises:
correcting the first-tracking drive control data to cancel the deviation amount, when the deviation amount is determined as exceeding the predetermined threshold value; and
setting the first-tracking drive control data to the second-tracking drive control data, when the deviation amount is determined as one not more than the predetermined threshold value.

7. The method according to claim 1,
wherein the first-tracking drive control data is for moving the image sensor in directions orthogonal to an optical axis of the photographing optical system and rotating the image sensor about an axis parallel to the optical axis while performing an exposure operation.

8. The method according to claim 1,
wherein the predetermined imaging area of the image sensor is a trimmed imaging area which is formed by partly electronically trimming an entire imaging area of the image sensor, and
wherein the first-tracking drive control data is for moving the trimmed imaging area in directions orthogonal to an optical axis of the photographing optical system and rotating the trimmed imaging area about an axis parallel to the optical axis while performing an exposure operation.

9. The method according to claim 1,
wherein the first-tracking photographing operation comprises performing an exposure operation while moving the predetermined imaging area of the image sensor and the image of the celestial object that is formed on the imaging surface of the image sensor.

10. The method according to claim 1,
wherein the judging judges whether the first-tracking drive control data is to be corrected, before correction is performed on the first-tracking drive control data using the deviation amount.

11. A photographic apparatus which automatically tracks and photographs a celestial object which moves relative to the photographic apparatus due to diurnal motion so that an image of the celestial object that is formed on an imaging surface of an image sensor via a photographing optical system of the photographic apparatus becomes stationary relative to a predetermined imaging area of the image sensor during a celestial-object auto-tracking photographing operation, the photographic apparatus comprising:
an obtainer that obtains azimuth information, with respect to the photographing apparatus, of the celestial object;
a calculator that calculates first-tracking drive control data for performing a first-tracking photographing operation based on the azimuth information;
a device that performs the first-tracking photographing operation, during a first predetermined exposure time, based on the first-tracking drive control data;
a device that obtains, after the first-tracking photographing operation based on the first-tracking drive control data finishes, a first image, upon lapse of a predetermined time after the first predetermined exposure time, and a second image, wherein the first image and the second image respectively correspond to a beginning and an ending of images taken by the first-tracking photographing operation;
a calculator that calculates an amount of deviation between a celestial object image in the first image and a corresponding celestial object image in the second image;
a judger that judges in accordance with a comparison between the deviation amount and a predetermined threshold value, whether a second-tracking photographing operation, based on second-tracking drive control data obtained by correcting said first-tracking drive control data, with a second predetermined exposure time, is to be performed, and
in response to a judging by the judger that said second-tracking photographing operation is to be performed, an actual photographing operation is performed with said second-tracking drive control data obtained by correcting said first-tracking drive control data.

12. The photographic apparatus according to claim 11,
wherein, when the second-tracking photographing operation is to be performed, the photographing apparatus further calculates, based on the amount of deviation, the second-tracking drive control data for performing the actual photographing operation with the deviation amount cancelled, and performs the actual photographing operation based on the second-tracking drive control data, and
wherein calculating the second-tracking drive control data comprises correcting the first-tracking drive control data with the deviation amount to calculate the second-tracking drive control data.

13. The photographic apparatus according to claim 11,
wherein performing the first-tracking photographing operation comprises performing an exposure operation while moving the predetermined imaging area of the image sensor and the image of the celestial object that is formed on the imaging surface of the image sensor.

14. The photographic apparatus according to claim 12,
wherein calculating the second-tracking drive control data comprises:
correcting the azimuth information based on the deviation amount; and
calculating the second-tracking drive control data for moving the predetermined imaging area of the image sensor and the image of the celestial object that is formed on the imaging surface of the image sensor based on the corrected azimuth information.

15. The photographic apparatus according to claim 12,
wherein, calculating the second-tracking drive control data further comprises moving the predetermined imaging area of the image sensor and the image of the celestial object that is formed on the imaging surface of the image sensor.

16. The photographic apparatus according to claim 12, wherein the judging comprises determining whether the deviation amount exceeds the predetermined threshold value, and calculating the second-tracking drive control data comprises:
  correcting the first-tracking drive control data to cancel the deviation amount, when the deviation amount is determined as exceeding the predetermined threshold value; and
  setting the first-tracking drive control data to the second-tracking drive control data, when the deviation amount is determined as not more than the predetermined threshold value.

17. The photographic apparatus according to claim 11, wherein the first-tracking drive control data is for moving the image sensor in directions orthogonal to an optical axis of the photographing optical system and rotating the image sensor about an axis parallel to the optical axis while performing an exposure operation.

18. The photographic apparatus according to claim 11, wherein the predetermined imaging area of the image sensor is a trimmed imaging area which is formed by partly electronically trimming an entire imaging area of the image sensor, and wherein the first-tracking drive control data is for moving the trimmed imaging area in directions orthogonal to an optical axis of the photographing optical system and rotating the trimmed imaging area about an axis parallel to the optical axis while performing an exposure operation.

19. The photographic apparatus according to claim 11, wherein the first-tracking photographing operation comprises performing an exposure operation while moving the predetermined imaging area of the image sensor and the image of the celestial object that is formed on the imaging surface of the image sensor.

20. The photographic apparatus according to claim 11, wherein the judger judges whether the first-tracking drive control data is to be corrected, before correction is performed on the first-tracking drive control data using the deviation amount.

21. A method of automatically tracking and photographing a celestial object which moves relative to a photographic apparatus due to diurnal motion so that an image of the celestial object that is formed on an imaging surface of an image sensor via a photographing optical system of the photographic apparatus becomes stationary relative to a predetermined imaging area of the image sensor during a celestial-object auto-tracking photographing operation, the method comprising:

obtaining azimuth information, with respect to the photographic apparatus, of the celestial object;
  calculating first-tracking drive control data for performing a first-tracking photographing operation based on the azimuth information;
  performing the first-tracking photographing operation, during a first predetermined exposure time, based on the first-tracking drive control data;
  obtaining, after the first-tracking photographing operation based on the first-tracking drive control data finishes, a first image, upon lapse of a predetermined time after the first predetermined exposure time, and a second image, wherein the first image and the second image respectively correspond to a beginning and an ending of images taken by the first-tracking photographing operation;
  calculating an amount of deviation between a celestial object image in the first image and a corresponding celestial object image in the second image; and
  judging, in accordance with a comparison between the deviation amount and a predetermined threshold value, whether a second-tracking photographing operation, with a second predetermined exposure time, is to be performed,
    wherein, when the second-tracking photographing operation is to be performed, the method further comprises:
      calculating, based on the amount of deviation, second-tracking drive control data for performing the second-tracking photographing operation with the deviation amount cancelled; and
      performing the second-tracking photographing operation based on the second-tracking drive control data, and
    wherein calculating second-tracking drive control data comprises correcting the first-tracking drive control data with the deviation amount to calculate the second-tracking drive control data.

22. A photographic apparatus which automatically tracks and photographs a celestial object which moves relative to the photographic apparatus due to diurnal motion so that an image of the celestial object that is formed on an imaging surface of an image sensor via a photographing optical system of the photographic apparatus becomes stationary relative to a predetermined imaging area of the image sensor during a celestial-object auto-tracking photographing operation, the photographic apparatus comprising:

an obtainer that obtains azimuth information, with respect to the photographing apparatus, of the celestial object;
  a calculator that calculates first-tracking drive control data for performing a first-tracking photographing operation based on the azimuth information;
  a device that performs the first-tracking photographing operation, during a first predetermined exposure time, based on the first-tracking drive control data;
  a device that obtains, after the first-tracking photographing operation based on the first-tracking drive control data finishes, a first image, upon lapse of a predetermined time after the first predetermined exposure time, and a second image, wherein the first image and the second image respectively correspond to a beginning and an ending of images taken by the first-tracking photographing operation;
  a calculator that calculates an amount of deviation between a celestial object image in the first image and a corresponding celestial object image in the second image; and
  a judger that judges in accordance with a comparison between the deviation amount and a predetermined threshold value, whether a second-tracking photographing operation, with a second predetermined exposure time, is to be performed,
    wherein, when the second-tracking photographing operation is to be performed, the photographing apparatus further calculates, based on the amount of deviation, second-tracking drive control data for performing the second-tracking photographing operation with the deviation amount cancelled, and performs the second-tracking photographing operation based on the second-tracking drive control data, and
    wherein calculating the second-tracking drive control data comprises correcting the first-tracking drive control data with the deviation amount to calculate the second-tracking drive control data.

* * * * *